(12) United States Patent
Hirooka et al.

(10) Patent No.: US 6,918,245 B2
(45) Date of Patent: Jul. 19, 2005

(54) SECONDARY AIR FEEDING APPARATUS AND METHOD OF DETECTING ABNORMALITY IN THE APPARATUS

(75) Inventors: Shigemasa Hirooka, Susono (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 10/449,670

(22) Filed: Jun. 2, 2003

(65) Prior Publication Data

US 2004/0011027 A1 Jan. 22, 2004

(30) Foreign Application Priority Data

Jun. 10, 2002 (JP) .................................. 2002-168843

(51) Int. Cl.$^7$ .................................................. F01N 3/00
(52) U.S. Cl. ........................... 60/289; 60/274; 60/277; 60/290; 60/292; 60/293
(58) Field of Search .......................... 60/274, 276, 277, 60/289, 290, 291, 292, 293, 307

(56) References Cited

U.S. PATENT DOCUMENTS

| 5,140,810 | A | * | 8/1992 | Kuroda ........................ 60/274 |
| 5,400,591 | A | | 3/1995 | Aramaki |
| 5,519,992 | A | | 5/1996 | Hosoya et al. |
| 5,560,199 | A | | 10/1996 | Agustin et al. |
| 5,706,653 | A | | 1/1998 | Shoji et al. |
| 5,782,086 | A | * | 7/1998 | Kato et al. ..................... 60/274 |
| 5,852,929 | A | | 12/1998 | Kato et al. |
| 5,921,077 | A | * | 7/1999 | Bayerle et al. ............... 60/274 |
| 6,023,401 | A | * | 2/2000 | Hashimoto et al. ........ 361/93.1 |
| 6,138,504 | A | | 10/2000 | Lewis et al. |
| 6,233,925 | B1 | | 5/2001 | Hirota et al. |
| 6,393,833 | B2 | * | 5/2002 | Mizoguchi .................... 60/289 |

FOREIGN PATENT DOCUMENTS

| JP | A 9-21312 | 1/1997 |
| JP | A 9-125945 | 5/1997 |
| JP | A 9-125946 | 5/1997 |

* cited by examiner

Primary Examiner—Binh Q. Tran
(74) Attorney, Agent, or Firm—Oliff & Berridge, PLC

(57) ABSTRACT

The invention relates to a secondary air feeding apparatus and a method of detecting an abnormality in the apparatus capable of making a precise determination on abnormalities in components and detecting operational failures as well. According to one aspect of the invention, the opening-closing state of opening-closing means (ASV) is switched during the operation of an air pump, and abnormalities in respective components are detected on the basis of pressure values and pressure fluctuation values detected by a pressure sensor disposed between the air pump and the ASV before and after the switching of the opening-closing means.

22 Claims, 20 Drawing Sheets

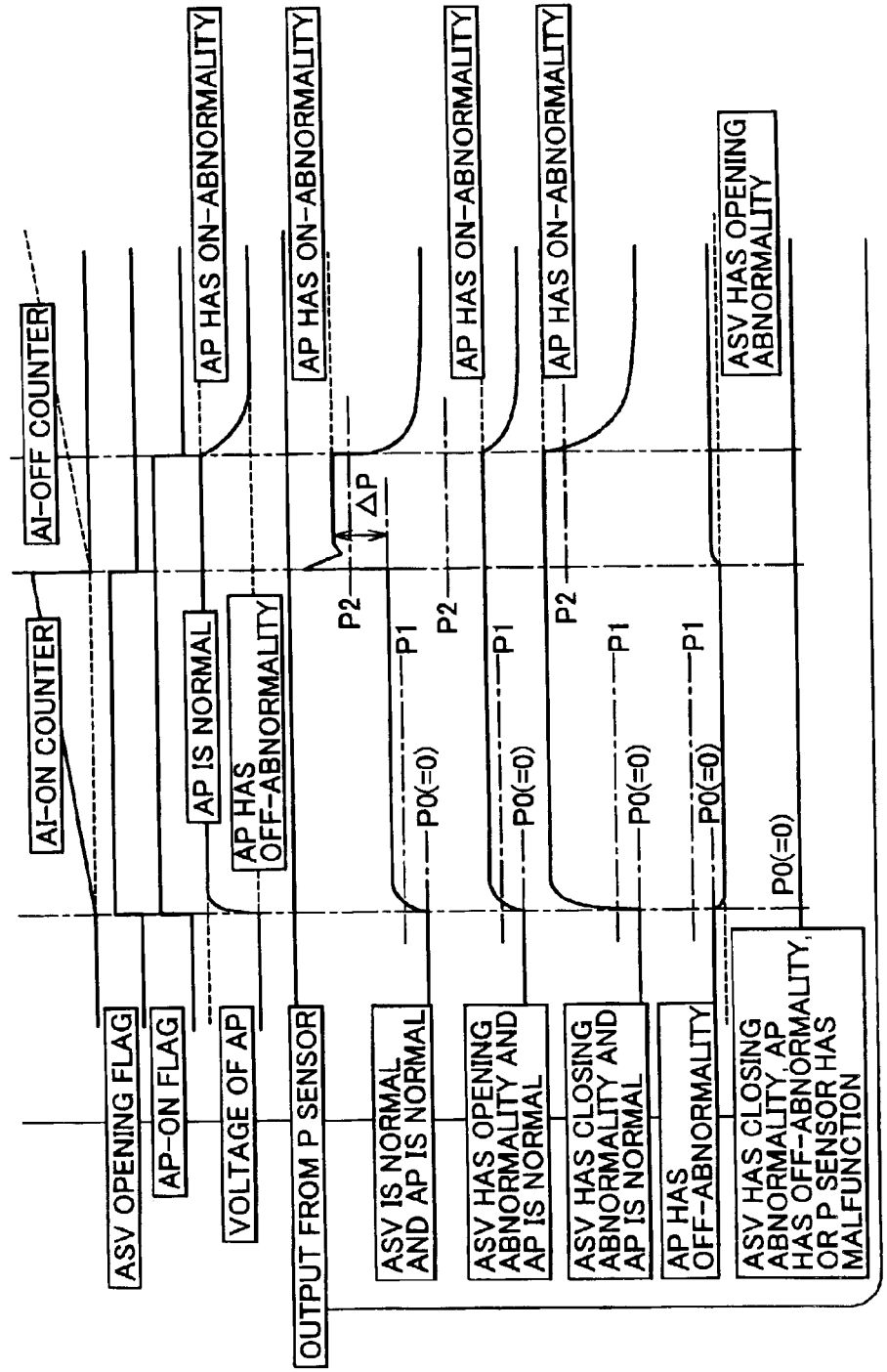

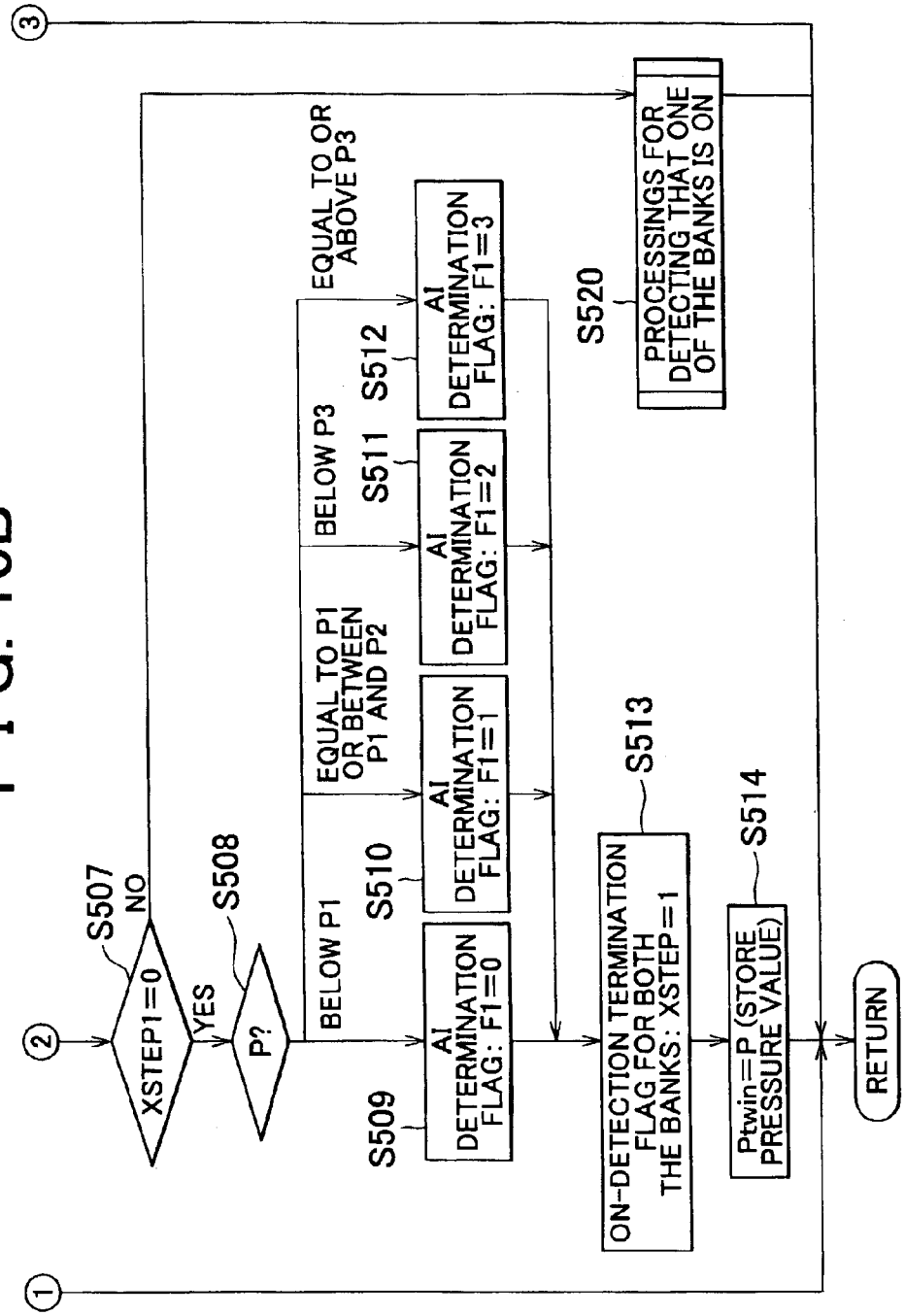

SECONDARY AIR FEEDING APPARATUS AND METHOD OF DETECTING ABNORMALITY IN THE APPARATUS

INCORPORATION BY REFERENCE

The disclosure of Japanese Patent Application No. 2002-168843 filed on Jun. 10, 2002, including the specification, drawings, and abstract is incorporated herein by reference in its entirety.

BACKGROUND OF THE INVENTION

1. Field of the Invention

The invention relates to a secondary air feeding apparatus for supplying secondary air to a region upstream of an exhaust gas purification unit disposed in an exhaust system of an internal combustion engine. More particularly, the invention relates to a secondary air feeding apparatus whose components can be subjected to a determination on abnormality, and to a method of detecting abnormalities in the components.

2. Description of the Related Art

As an exhaust purification unit for internal combustion engines, there has been known a unit for purifying exhaust gas by reducing the concentrations of CO, HC, and NOx components contained therein by means of a three-way catalyst disposed in an exhaust system. In addition, there has also been known an art for promoting the purification of exhaust gas by forcibly feeding air from an air pump to a secondary air feeding passage having an opening-closing valve connected to an exhaust pipe, thereby increasing the concentration of oxygen, and oxidizing the HC and CO contained in exhaust gas.

If an abnormality occurs in a component such as the air pump or the opening-closing valve in the secondary air feeding apparatus as described above, the efficiency of purifying exhaust gas decreases, which causes a deterioration in exhaust emission properties. Therefore, it is necessary to make a determination on the abnormality at an early stage. In order to detect abnormalities of this kind, therefore, there have been known arts disclosed in Japanese Patent Application Laid-Open No. 9-21312 and Japanese Patent Application Laid-Open No. 9-125945.

According to the former, a pressure sensor is disposed in a secondary air feeding passage between an air pump and an opening-closing valve, and an abnormality in a secondary air feeding apparatus is detected on the basis of a pressure value detected by the pressure sensor. According to the latter, a pressure sensor is disposed in a secondary air feeding passage, and an abnormality in a secondary air feeding apparatus is detected on the basis of a difference between maximum and minimum pressure fluctuation values detected by the pressure sensor.

According to these arts, however, although it is possible to detect an abnormality in the secondary air feeding apparatus itself, it is difficult to precisely determine which component of the apparatus is abnormal. Furthermore, in the case of an operational failure (e.g., the clogging of a line or the like), namely, if pressure values and pressure fluctuation values are normal despite an abnormality in the function of a certain component of the apparatus, the detection of the abnormality is impossible.

SUMMARY OF THE INVENTION

It is therefore an object of the invention to provide a secondary air feeding apparatus and a method of detecting an abnormality in the apparatus which makes it possible to make a precise determination on the abnormalities in various components and to detect operational failures as well.

To achieve the object stated above, a secondary air feeding apparatus in accordance with a first aspect of the invention comprises a secondary air feeding passage that supplies secondary air to a region upstream of an exhaust gas purification unit of an internal combustion engine, an air pump disposed in the secondary air feeding passage, an opening-closing portion which is disposed downstream of the air pump and which switches an opening-closing state of the secondary air feeding passage, and further includes a pressure sensor disposed between the air pump and the opening-closing portion and an abnormality detection portion that detects abnormalities in components on the basis of pressure values before and after the switching of the opening-closing state of the opening-closing portion as detected by the pressure sensor during the operation of the air pump and on the basis of a difference between the pressure values.

Alternatively, a secondary air feeding apparatus in accordance with a second aspect of the invention is adapted to supply secondary air to a region upstream of a plurality of exhaust gas purification units that are arranged in association with one or more cylinders of a multi-cylinder internal combustion engine, comprises a main passage forming an upstream portion of the secondary air feeding passage, a plurality of branch passages forming a downstream portion of the secondary air feeding passage, an air pump disposed in the main passage, opening-closing portions which is disposed in the branch passages respectively and which switches opening-closing states of the branch passages respectively, and further includes a pressure sensor disposed downstream of the air pump in the main passage and an abnormality detection portion that switches opening-closing states of the opening-closing portions one by one during the operation of the air pump and that detects abnormalities in components on the basis of pressure values before and after the switching of each of the opening-closing portions and on the basis of a difference between the pressure values.

Instead of making a determination on the basis of a pressure value and a pressure fluctuation value in a certain state as in the case of the related art, according to the invention, pressure values (preferably a temporal average thereof) downstream of the air pump before and after the switching of opening-closing states of the opening-closing means during the operation of the air pump are detected, the pressure values and a difference between them are calculated, and abnormalities in the components are detected on the basis of the values thus calculated. The behavior of the pressure downstream of the air pump differs, and the combination of pressure values before and after the switching of the opening-closing means and a difference between the pressure values differs, depending on which one of malfunction modes has been entered. Accordingly, a certain one of the malfunction modes can be specified by detecting the pressure behavior before and after the switching of the opening-closing means.

Further, a method of detecting, in accordance with a first aspect of the invention, an abnormality in a secondary air feeding apparatus including a secondary air feeding passage that supplies secondary air to a region upstream of an exhaust gas purification unit of an internal combustion engine, an air pump disposed in the secondary air feeding passage, an opening-closing portion which is disposed downstream of the air pump and which switches an opening-closing state of the secondary air feeding passage by means of an opening signal and a closing signal, and a pressure sensor disposed between the air pump and the opening-closing portion is characterized by comprising the step of detecting, during the operation of the air pump, abnormalities in components of the secondary air feeding apparatus on the basis of an opening pressure value detected by the pressure sensor as a pressure value after the receipt of the opening signal in the opening-closing portion, a closing pressure value detected by the pressure sensor as a pressure value after the receipt of the closing signal in the opening-closing portion, and a difference between the opening pressure value and the closing pressure value.

Moreover, a method of detecting, in accordance with a second aspect of the invention, an abnormality in a secondary air feeding apparatus including a secondary air feeding passage that supplies secondary air to a region upstream of a plurality of exhaust gas purification units that are arranged in association with one or more cylinders of a multi-cylinder internal combustion engine, a main passage forming an upstream portion of the secondary air feeding passage, a plurality of branch passages forming a downstream portion of the secondary air feeding passage, an air pump disposed in the main passage, opening-closing portion which is disposed in the branch passages respectively and which switches opening-closing states of the branch passages respectively, and a pressure sensor disposed downstream of the air pump in the main passage is characterized by comprising the step of detecting, during the operation of the air pump, abnormalities in components of the secondary air feeding apparatus on the basis of an opening pressure value detected by the pressure sensor as a pressure value after the receipt of the opening signal in each of the opening-closing portions and a closing pressure value detected by the pressure sensor as a pressure value after the receipt of the closing signal in each of the opening-closing portions.

BRIEF DESCRIPTION OF THE DRAWINGS

FIG. 2 is a time chart illustrating how pressure changes measured by a pressure sensor from a timing when the apparatus shown in FIG. 1 has not been operated yet to a timing when the apparatus shown in FIG. 1 has been stopped differ depending on the operational states of respective components.

DETAILED DESCRIPTION OF PREFERRED EMBODIMENTS

Figure 1:
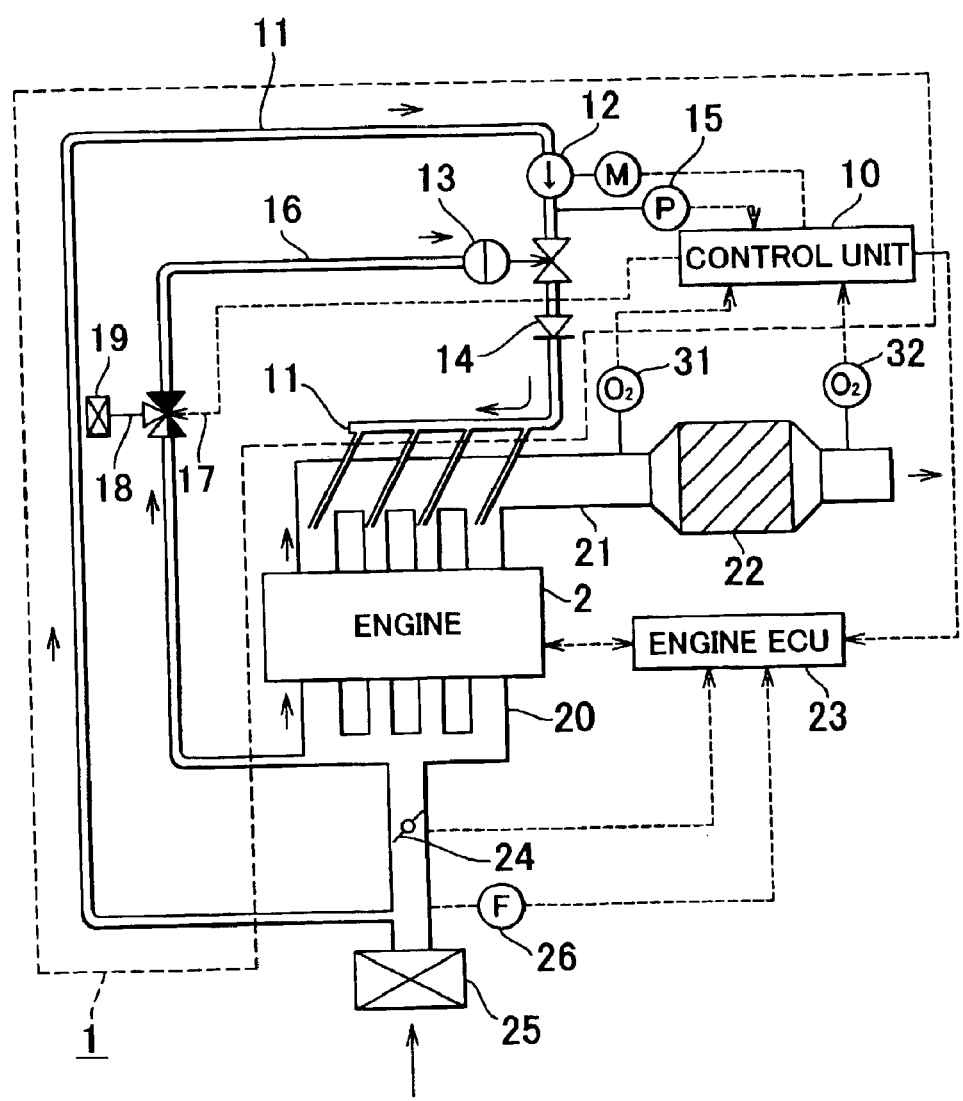
FIG. 1 is a schematic view of the arrangement of a secondary air feeding apparatus in accordance with a first embodiment of the invention.

Hereinafter, preferred embodiments of the invention will be described in detail with reference to the accompanying drawings. In order to make the following description easy to understand, like components are denoted by like reference numerals throughout the drawings if possible, and repetition of the same description will be avoided.

FIG. 1 is a schematic view of the arrangement of a secondary air feeding apparatus in accordance with the first embodiment of the invention. This secondary air feeding apparatus 1 is mounted on a multi-cylinder gasoline engine as an internal combustion engine (hereinafter referred to simply as the engine) 2. An intake pipe 20 and an exhaust pipe 21 are connected to the engine 2. A throttle 24 is disposed in the intake pipe 20, which is connected to an intake air filter 25. An airflow meter 26 for measuring air amount (primary air amount) is disposed between the intake air filter 25 and the throttle 24. On the other hand, an exhaust gas purification unit 22 constructed of a three-way catalyst is disposed in a downstream portion of the exhaust pipe 21. $O_2$ sensors 31 and 32 for detecting the concentration of oxygen contained in exhaust gas are disposed in upstream and downstream portions of the exhaust gas purification unit respectively. It is to be noted herein that A/F sensors or linear $O_2$ sensors may be employed instead of the $O_2$ sensors.

The secondary air feeding apparatus 1 includes a secondary air feeding passage 11 that connects the intake pipe 20 at a position between the throttle 24 and the intake air filter 25 to the exhaust pipe 21 at a position between the engine 2 and the upstream-side $O_2$ sensor 31. In a direction from the intake pipe 20 to the exhaust pipe 21, an air pump (AP) 12 driven by an electric motor, an air switching valve (ASV) 13, and a reed valve (RV) 14 as a check valve are disposed in this order along the secondary air feeding passage 11. A pressure sensor 15 is disposed between the AP 12 and the ASV 13. A line 16 extending from the intake pipe 20 at a position downstream of the throttle 24 is connected to the ASV 13. The line 16 extends through a three-way valve 17. The other port of the three-way valve 17 is exposed to outside air through a line 18 and a filter 19.

An engine ECU 23 for controlling the engine and a control unit 10 for controlling the operation of the secondary air feeding apparatus 1 are connected to each other so as to exchange information between them. Output signals delivered from the pressure sensor 15 and the $O_2$ sensors 31 and 32 are input to the control unit 10. The control unit 10 controls the motorized driving of the AP 12 and the operation of the three-way valve 17. The control unit 10 may constitute part of the engine ECU 23.

With fuel concentration being high, with air-fuel ratio (A/F) being low, and with the function of the exhaust gas purification unit 22 being unlikely to be fully performed because of an insufficient rise in the temperature of the unit 22, mainly as in the case of cold start or the like, the secondary air feeding apparatus 1 allows the control unit 10 to control the three-way valve 17 so as to connect the line 16 to the side of the intake pipe 20, so that the negative pressure in the intake pipe 20 is introduced into the ASV 13. Thus, the ASV 13 is controlled to be opened and the AP 12 is driven, whereby part of air flowing through the air filter 25 is introduced into the exhaust pipe 21 through the secondary air feeding passage 11. By thus supplying secondary air, the concentration of oxygen contained in exhaust gas is increased, the A/F thereof is increased, and the secondary combustion of HC and CO contained in exhaust gas in the exhaust pipe 21 is promoted, so that exhaust gas is purified. Also, a deterioration in exhaust emission properties is suppressed by raising exhaust gas temperature and thus promoting a rise in the temperature of the exhaust gas purification unit (three-way catalyst) 22. Instead of combining the ASV 13 with the three-way valve 17, direct use of an electromagnetic valve in a region of the ASV 13 is also possible.

The secondary air feeding apparatus 1 is characterized by having the function of detecting the abnormality in its components, namely, the AP 12 and the ASV 13. More specifically, the control unit 10 detects the abnormality in the components on the basis of the pressure behavior detected by the pressure sensor 15 disposed in the secondary air feeding passage 11. A routine of abnormality detection processings will be described hereinafter in detail.

Figure 3A:
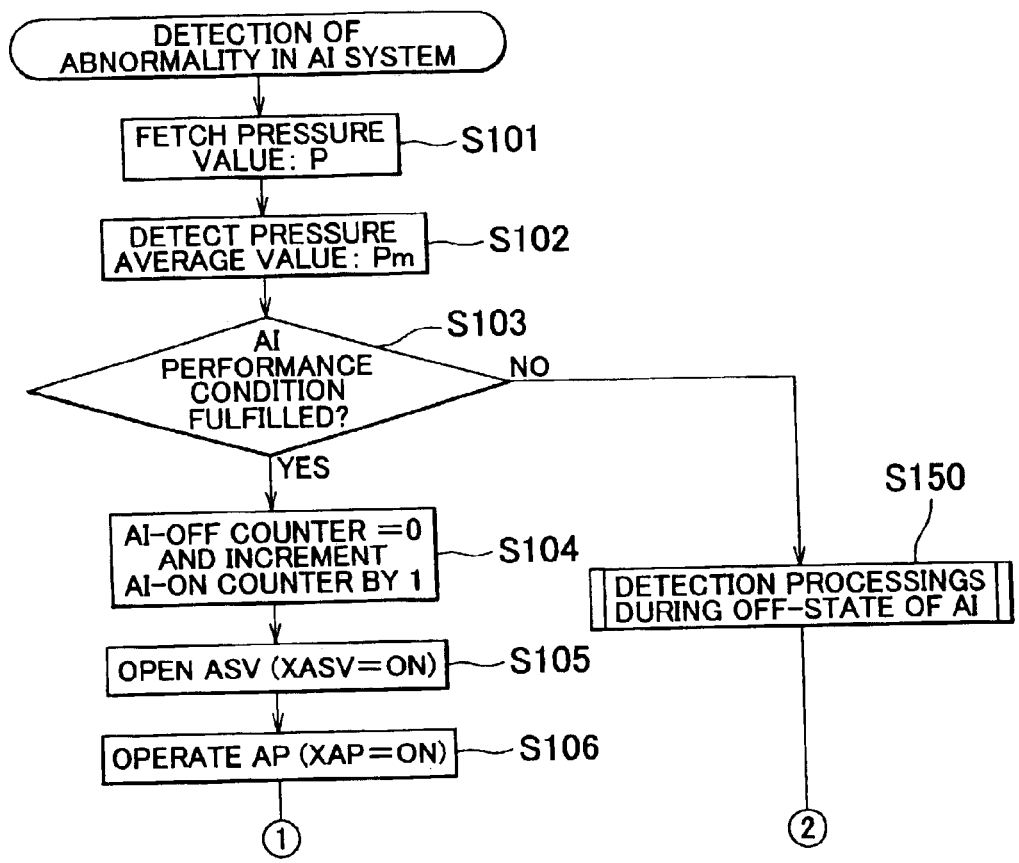
FIG. 3 is a flowchart showing main processings for detecting abnormality in the apparatus shown in FIG. 1.
Figure 3B:
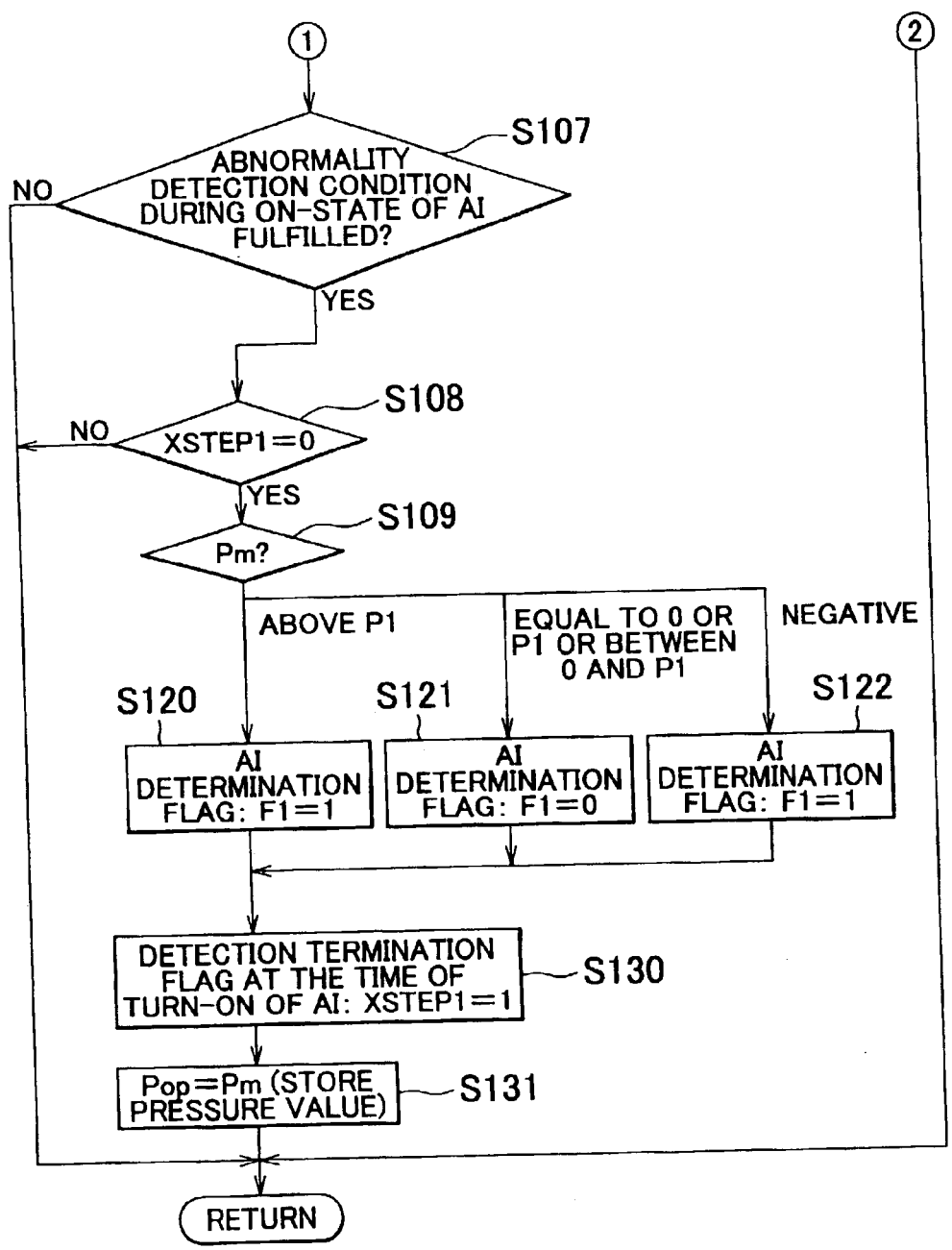
Figure 4A:
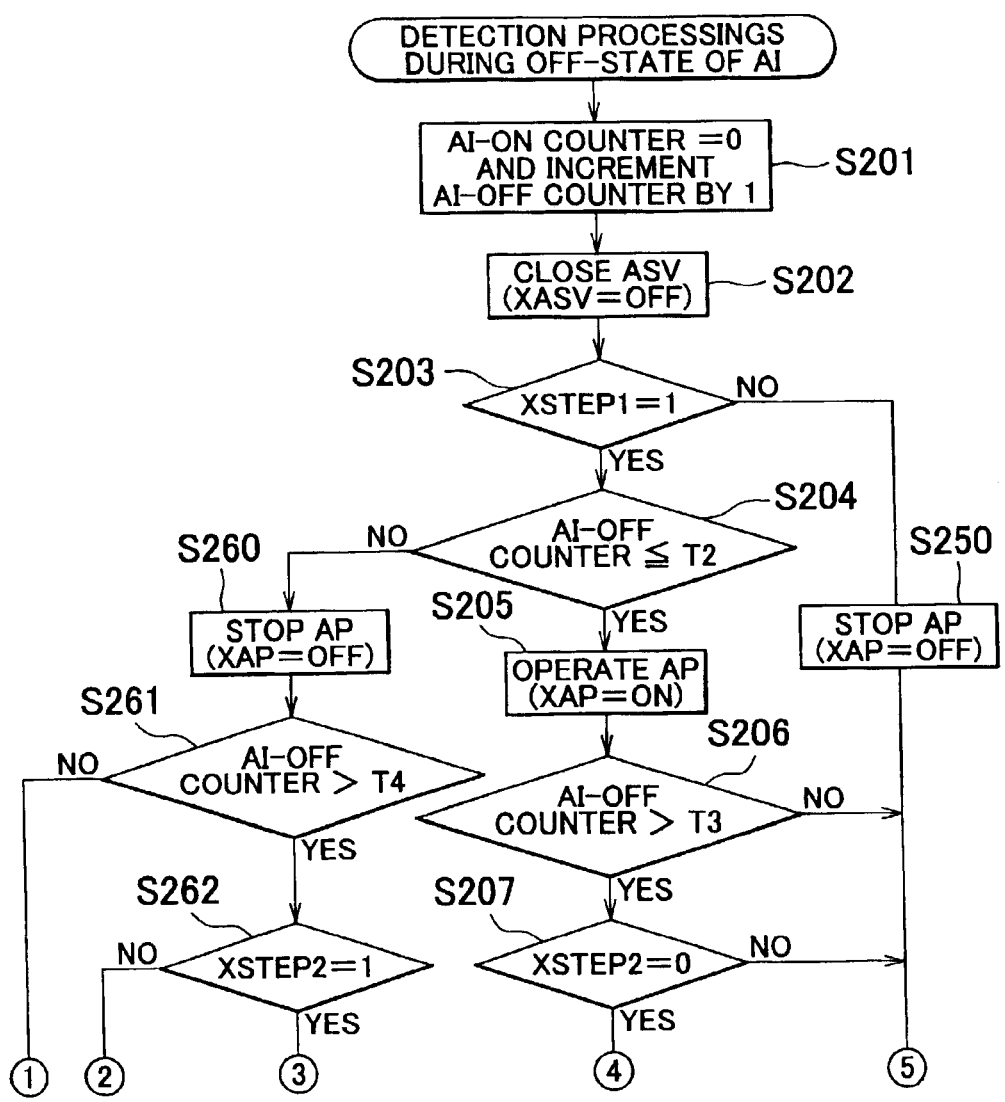
FIG. 4 is a flowchart showing pressure detection processings that are performed when an AI system of the apparatus shown in FIG. 1 is OFF.
Figure 4B:
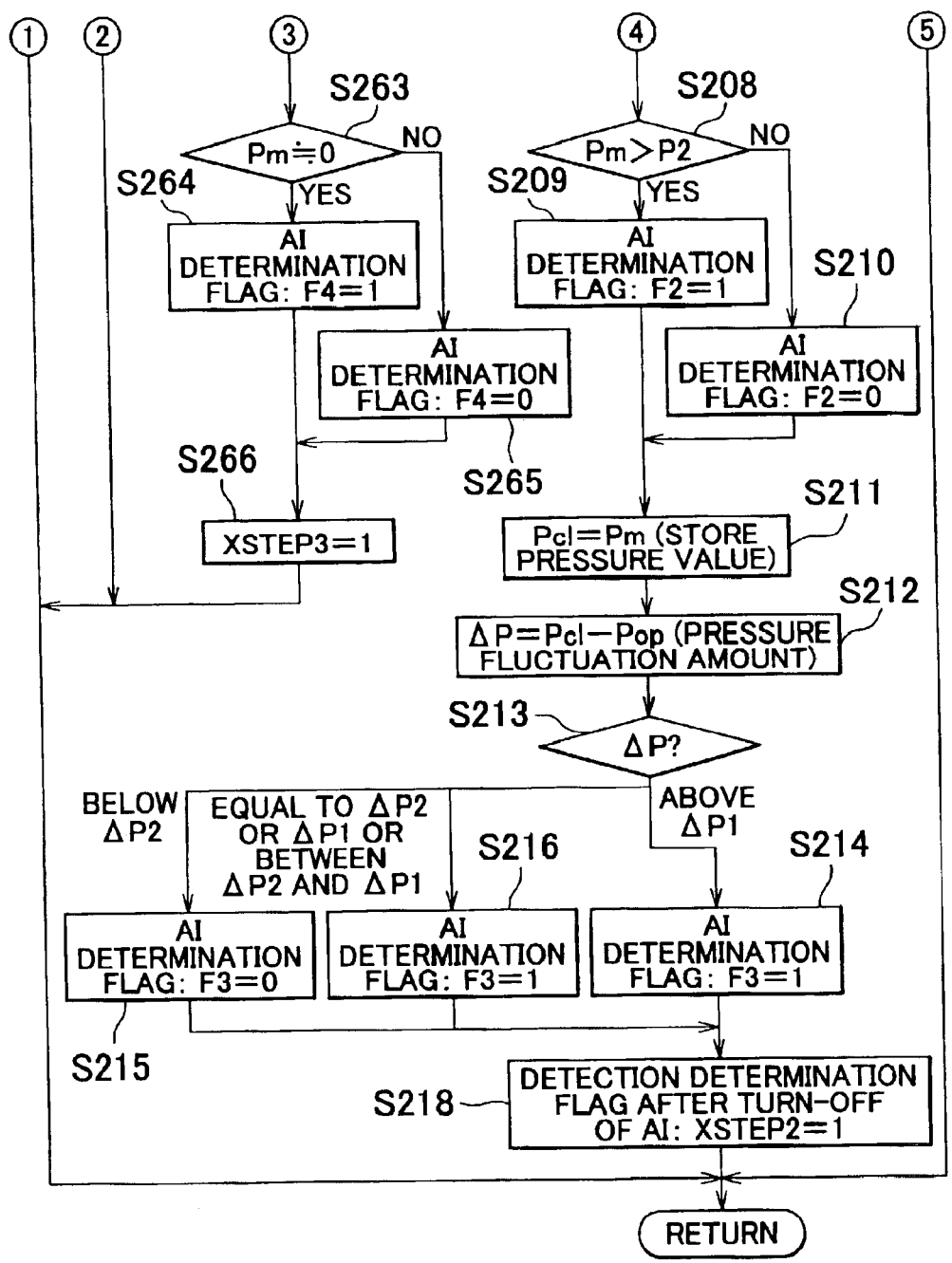
Figure 5A:
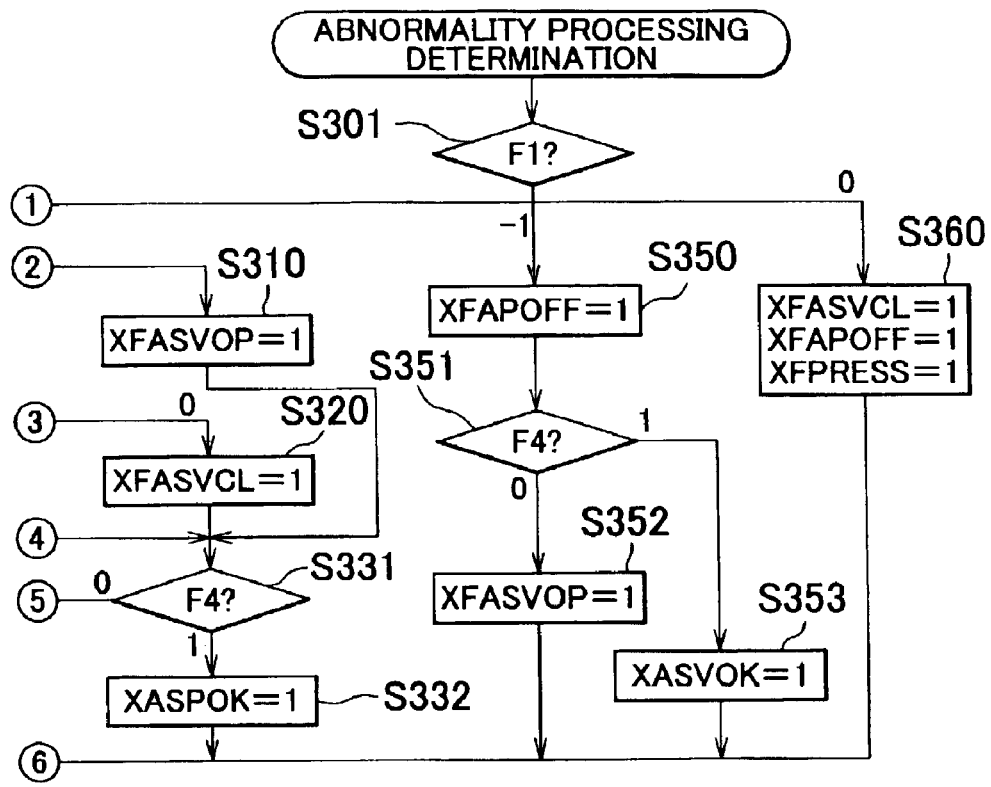
FIG. 5 is a flowchart showing abnormality determination processings performed by the apparatus shown in FIG. 1.
Figure 5B:
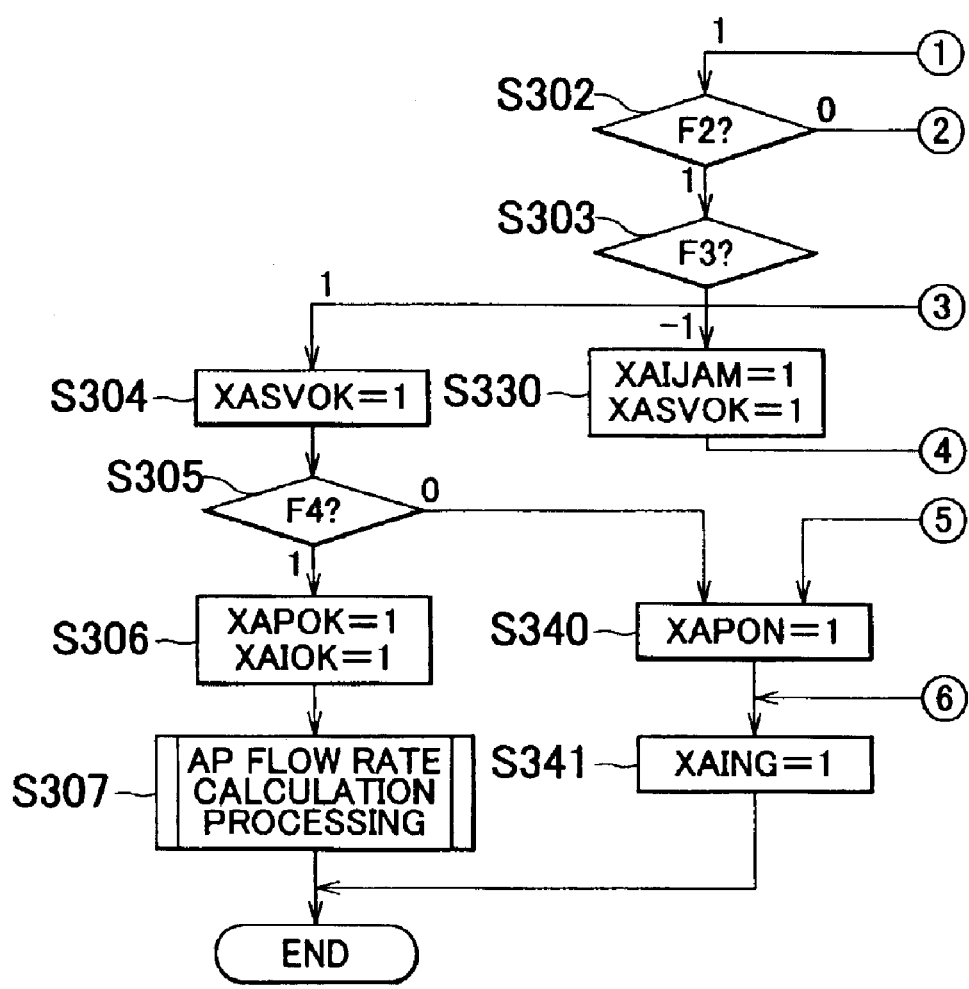

FIG. 2 is a time chart illustrating how pressure changes measured by the pressure sensor 15 from a timing when a secondary air feeding (AI) system has not been operated yet to a timing when the system has been stopped differ depending on the operational states of respective components. FIGS. 3 to 5 are flowcharts of abnormality detection processings. FIG. 3 is the flowchart illustrating main processings of detection. FIG. 4 is the flowchart illustrating pressure detection processings that are performed when the AI system is OFF. FIG. 5 is the flowchart illustrating abnormality determination processings.

These processings are basically performed by the control unit 10. After the engine has been started, the processings shown in FIG. 3 are repeatedly performed until XSTEP3 is set as 1, that is, until pressure detection processings performed during the turn-ON and the turn-OFF of the AI system for use in the detection of abnormality are terminated. The processings shown in FIG. 4 are invoked from the main processings shown in FIG. 3. After the processings shown in FIG. 3 have been terminated with XSTEP3 being set as 1, the abnormality determination processings shown in FIG. 5 are then performed only once on the basis of pressure values detected in the processings shown in FIGS. 3 and 4.

First of all, the main processings shown in FIG. 3 will be described. In a step S101, a pressure value P as an output value of the pressure sensor 15 is fetched. In a step 102 succeeding the step S101, a temporal average Pm between the output value fetched in the step S101 and an output value within a predetermined period in the past is calculated. A determination on abnormality is made on the basis of the temporal average thus calculated, whereby precise detection of abnormality is made possible without being affected by pressure fluctuations.

It is checked in a step S103 whether or not an AI performance condition has been fulfilled. This performance condition is determined by information sent from the engine ECU 23, that is, engine coolant temperature, intake air temperature, elapsed time since the start of the engine, battery voltage, load conditions, and the like. In the case where the AI performance condition has not been fulfilled, if it is determined that the performance of AI is not required, the control proceeds to a step S150, which will be described later. If the performance of AI is to be required later although the AI performance condition has not been fulfilled yet, the control waits in the step S103 until the condition is fulfilled. If the AI performance condition has been fulfilled, the control proceeds to a step S104.

In the step S104, an AI-OFF counter is reset as 0 while an AI-ON counter is incremented by 1. The AI-OFF counter indicates the number of duration time steps after the stoppage of AI, whereas the AI-ON counter indicates the number of duration time steps during the operation of AI. Then, the ASV 13 is controlled to be opened (in the step S105) and a command to operate the AP 12 is issued (in the step S106). Owing to a command to open the ASV 13, the three-way valve 17 connects the line 16 to the side of the intake pipe 20, so that a negative pressure in the intake pipe 20 is introduced into the ASV 13. Thus, if the ASV 13 is closed, it is switched to an open state. The AP 12 is then operated, whereby secondary air is supplied. More specifically, part of air flowing through the air filter 25 through the secondary air feeding passage 11 is introduced into the exhaust pipe 21.

It is checked in a step S107 whether or not an abnormality detection condition during the operation of AI has been fulfilled. This abnormality detection condition signifies such a condition as makes it easy to detect abnormality, for example, a condition that the operation of the AP 12 be stabilized after the lapse of a predetermined period since the performance of AI, a condition that the engine be regarded as being in an idling state on the basis of speed and load of the engine 2 and a condition concerning vehicle speed, or the like. If the abnormality detection condition has been fulfilled, the control proceeds to a step S108 so as to detect the pressure behavior during feeding control. If the abnormality detection condition has not been fulfilled, the control is terminated with the subsequent processings being skipped.

It is determined in the step S108 whether or not a pressure detection termination flag XSTEP1 indicates 0 as a value indicative of the incompletion of detection during the operation of AI. Only if the pressure detection termination flag XSTEP1 indicates 0 as a value indicative of the incompletion of detection, the control proceeds to a step S109 so as to carry out detection. If the pressure detection termination flag XSTEP1 indicates 1 as a value indicative of the completion of detection, the control is terminated with the subsequent processings being skipped. In the step S109, a determination on the pressure average Pm calculated in the step S102 is initially made. If the AP 12 is functioning normally, the pressure average Pm ought to increase as shown in FIG. 2. Therefore, if the pressure average Pm has exceeded a predetermined threshold P1, the control proceeds to a step S120 where an AI determination flag F1 is set as 1, which is a value indicating that the AP 12 is normal.

As is apparent from FIG. 2, if an OFF malfunction of the AP 12 and a closing malfunction of the ASV 13 are simultaneously caused, if there is a malfunction in the pressure sensor 15, or if an abnormality such as blocking has occurred, the pressure average Pm ought to stop increasing or to increase slightly. Therefore, if the pressure average Pm is equal to 0 or P1 or between 0 and P1, the control proceeds to a step S121 where an AI determination flag F1 is set as 0, which is a value indicative of an inability to determine whether the AP 12 is normal or abnormal.

As shown in FIG. 2, if the AP 12 has been stopped while the ASV 13 is functioning normally, a negative pressure on the side of the exhaust pipe 21 is transmitted, so that the pressure average Pm assumes a negative value. Accordingly, if the pressure average Pm is negative, the control proceeds to a step S122 where the AI determination flag is set as −1, which indicates that the AP 12 has been stopped.

After the AI determination flag F1 has been set in the step S120, the step S121, or the step S122, the control proceeds to a step S130 where the pressure detection termination flag XSTEP1 during the operation of AI is set as 1. Then, the pressure Pm during operation is stored into a variable Pop (in a step S131), whereby the processings illustrated in FIG. 3 are terminated.

If it is determined in the step S103 that the AI performance condition has not been fulfilled, the control proceeds to a step 150 where pressure detection processings during the stoppage of AI are performed. Thus, the control is terminated.

First of all in the pressure detection processings during the stoppage of AI, as shown in FIG. 4, the AI-ON counter is reset as 0 and the AI-OFF counter is incremented by 1 in a step S201. Then in a step S202, the ASV 13 is controlled to be closed. Owing to a command to close the ASV 13, the three-way valve 17 connects the line 16 to the side of the line 18, so that outside air is introduced into the ASV 13 through the filter 19. Thus, if the ASV 13 is open, it is switched to a closed state.

In a step S203 succeeding the step S202, the pressure detection termination flag XSTEP1 during the operation of AI is checked. In the case where the pressure detection termination flag XSTEP1 indicates a value other than 1, more concretely, 0 as an initial value, if pressure detection during the operation of AI has not been carried out, for example, if AI has not been performed yet immediately after the start of the engine, the control proceeds to a step S250 on the ground that a pressure detection processing condition after the operation of AI has not been fulfilled. In the step S250, a command to stop the operation of the AP 12 is issued. The control is then terminated with the subsequent processings being skipped.

If the pressure detection termination flag XSTEP1 indicates 1, namely, if pressure detection during the operation of AI has been terminated, the control proceeds to a step S204 where the value of the AI-OFF counter is compared with a threshold T2. If the value of the AI-OFF counter is equal to or smaller than the threshold T2, the control proceeds to the step S205 where a command to continue the operation of the AP 12 is issued. In a step S206 succeeding the step S205, the value of the AI-OFF counter is compared with a threshold T3. It is to be noted herein that T2>T3. If the value of the AI-OFF counter is equal to or smaller than the threshold T3, the discharge pressure of the AP 12 may be unstable because the ASV 13 has just been shut off. Therefore, the control is terminated with the subsequent processings being skipped. If the value of the AI-OFF counter has exceeded the threshold T3, it is determined that the discharge pressure of the AP 12 has been stabilized because a sufficient length of time has elapsed since the shutoff of the ASV 13, and the control proceeds to a step S207. It is determined in the step S207 whether or not a pressure detection termination flag XSTEP2 immediately after the stoppage of AI indicates 0, which is a value indicative of the incompletion of detection. Only if the pressure detection termination flag XSTEP2 indicates 0 as a value indicative of the incompletion of detection, the control proceeds to a step S208 so as to carry out detection. If the pressure detection termination flag XSTEP2 indicates 1 as a value indicative of the completion of detection, the control is terminated with the subsequent processings being skipped.

In the step S208, the pressure average Pm is compared with a threshold P2. It is to be noted herein that a relationship P2>P1 is established. If the pressure average Pm is above P2, it is determined, as is apparent from FIG. 2, that the AP 12 is in operation and that the ASV 13 has been shut off (including a closing malfunction of the ASV 13). Then in a step S209, an AI determination flag F2 is set as 1, which is a value indicative of this state. On the other hand, if the pressure average Pm is equal to or lower than P2, it is determined that the ASV 13 is open, that the AP 12 is out of operation, or that the pressure sensor 15 is abnormal. Then in a step S210, the AI determination flag F2 is set as 0, which is a value indicative of this state.

After the AI determination flag F2 has been set in the step S209 or S210, the control proceeds to a step S211. Then, a pressure Pm at the time of closing control of the ASV 13 during the operation of the AP 12 is stored into a variable Pc1 (in the step S211), and a pressure fluctuation amount ΔP at the time of the opening-closing switching of the ASV 13 during the operation of the AP 12 is calculated by finding a difference between Pop and Pc1 (in a step S212).

In a step S213 succeeding the step S212, a determination on the pressure fluctuation amount ΔP is made. If the opening-closing switching of the ASV 13 is normally performed during the operation of the AP 12, the downstream side is shut off, whereby the pressure value ought to increase in response to the shutoff of the ASV 13, as is apparent from FIG. 2. Accordingly, if the pressure fluctuation amount ΔP is larger than a predetermined threshold ΔP1, namely, if pressure fluctuations resulting from the opening-closing switching control of the ASV 13 are great, the control proceeds to a step S214 where an AI determination flag F3 is set as 1, which is a value indicative of this state.

On the other hand, if the operational state of the ASV 13 remains unchanged despite the opening-closing switching control, the pressure fluctuation amount ΔP ought to be almost zero before or after the ASV 13 is opened or closed. Therefore, if the pressure fluctuation amount ΔP is smaller than a predetermined threshold ΔP2 that is smaller than ΔP1, the control proceeds to a step S215 where the AI determination flag F3 is set as 0, which is a value indicative of this state.

Further, if the secondary air feeding passage 11 is clogged despite the switching of the ASV 13 itself to a shut-off state through shut-off control, pressure fluctuations ought to be caused even though they are minor ones. In the case of ΔP2≦ΔP≦ΔP1, therefore, the control proceeds to a step S216 where the AI determination flag F3 is set as −1, which is a value indicative of this state. After the processings in the steps S214 to S216 have been terminated, the control proceeds to a step S218. In the step S218, the pressure detection termination flag XSTEP2 immediately after the stoppage of AI is set as 1, whereby the processings illustrated in FIG. 4 are terminated.

On the other hand, if the value of the AI-OFF counter is above the threshold T2 in the step S204, the control proceeds to a step S260 where a command to stop the AP 12 is issued. In a step S261, the value of the AI-OFF counter is compared with a threshold T4. It is to be noted herein that T4>T2. If the value of the AI-OFF counter is equal to or smaller than the threshold T4, the pressure in the line 11 may be unstable because the command to stop the AP 12 has just been issued. Therefore, the control is terminated with the subsequent processings being skipped. If the value of the AI-OFF counter is above the threshold T4, it is determined that a sufficient length of time has elapsed after the stoppage of the AP 12 and that the pressure in the line 11 has been stabilized. Then, the control proceeds to a step S262.

It is determined in the step S262 whether or not the pressure detection termination flag XSTEP2 after the stoppage of AI indicates 1 as a value indicative of the completion of detection. If the pressure detection termination flag XSTEP2 indicates 0 as a value indicative of the incompletion of detection, the pressure detection termination condition after the complete stoppage of AI has not been fulfilled. Therefore, the control is terminated with the subsequent processings being skipped.

If the pressure detection termination flag XSTEP2 indicates 1 as a value indicative of the completion of detection in the step S262, the control proceeds to a step S263 where it is determined whether or not the pressure value Pm is equal to 0. In the case where the AP 12 has been stopped and where the ASV 13 has been closed (including a case where there is a malfunction in the pressure sensor 15), the pressure value Pm is approximately 0. In this case, therefore, the control proceeds to a step S264 where an AI determination flag F4 is set as 1, which is a value indicative of this state. On the other hand, if the pressure value assumes a value other than 0, it is manifest that the AP 12 is in operation or that the ASV 13 is open. In this case, therefore, the control proceeds to a step S265 where the AI determination flag F4 is set as 0, which is a value indicative of this state. After the termination of the step S264 or S265, a pressure detection termination flag XSTEP3 after the complete stoppage of AI is set as 1 in a step S266 in either case, whereby the processings illustrated in FIG. 4 are terminated.

According to the aforementioned processings, the AI determination flags F1 to F4 are set as flag values corresponding to respective operational states. Herein, a table 1 below illustrates how the values of the flags are related to the normality or abnormality of the components concerned.

TABLE 1

| MAL-FUNCTION MODE | AP | ASV | F1 | F2 | F3 | F4 |
|---|---|---|---|---|---|---|
| 1 | NORMAL | NORMAL | 1 | 1 | 1 | 1 |
| 2 | | OPENING MALFUNCTION | 1 | 0 | 0 | 1 |
| 3 | | CLOSING MALFUNCTION | 1 | 1 | 0 | 1 |
| 4 | ON MALFUNCTION | NORMAL | 1 | 1 | 1 | 0 |
| 5 | | OPENING MALFUNCTION | 1 | 0 | 0 | 0 |
| 6 | | CLOSING MALFUNCTION | 1 | 1 | 0 | 0 |
| 7 | OFF MALFUNCTION | NORMAL | −1 | 0 | −1 | 1 |
| 8 | | OPENING MALFUNCTION | −1 | 0 | 0 | 0 |
| 9 | | CLOSING MALFUNCTION | 0 | 0 | 0 | 1 |
| 10 | MALFUNCTION IN PRESSURE SENSOR | | 0 | 0 | 0 | 1 |

Abnormality determination processings shown in FIG. 5 are intended to specify which one of the components is subjected to a malfunction with reference to the values of the flags in the above table.

In a step S301, first of all, a determination on the value of the flag F1 is made. If the flag F1 indicates 1, it is determined that the AP 12 is normal or in one of modes 1 to 6 as permanently malfunctioning states, and the control proceeds to a step S302. If the value of the flag F1 is −1, it is determined that the AP 12 is in a mode 7 or a mode 8, and the control proceeds to a step S350 that will be described later. If the value of the flag F1 is 0, it is determined that the AP 12 is in one of the other modes, namely, modes 9 and 10, and the control proceeds to a step S360 that will be described later.

In the step S302, a determination on the value of the flag F2 is made. If the value of the flag F2 is 1, it is determined that the ASV 13 is normal or in one of the modes 1, 3, 4 and 6 as closing malfunction states, and the control proceeds to a step S303. If the value of the flag F2 is 0, it is determined that the ASV 13 is in one of the modes 2 and 5 as opening malfunction states, and the control proceeds to a step S310 that will be described later.

In the step S303, a determination on the value of the flag F3 is made. If the value of the flag F3 is 1, it is determined that the ASV 13 is in one of the modes 1 and 4 as normal operation modes, and the control proceeds to a step S304. If the flag F3 indicates 0, it is determined that the ASV 13 is in one of the modes 3 and 6 as closing malfunction states, and the control proceeds to a step S320 that will be described later. Further, if the flag F3 indicates −1, it is determined that the ASV 13 is in one of variants of modes 1 and 4 accompanied by the clogging of the line, namely, modes 1' and 4', and the control proceeds to a step S330.

In the step S304, a flag XASVOK indicating that the ASV is normal is set as 1, and the control proceeds to a step S305 where a determination on the value of the flag F4 is made. If the value of the flag F4 is 1, it is determined that the mode 1 has been entered, and the control proceeds to a step S306 where both an AP normality flag XAPOK and an AI normality flag XAIOK are set as 1. Processings of calculating and learning the flow rate of the AP as described later are performed in a step S307, whereby the determination processings illustrated in FIG. 5 are terminated. If the value of the flag F4 is 0 in the step S305, it is determined that the mode 4 has been entered, and the control proceeds to a step S340 where an ON abnormality flag XFAPON of the AP 12 is set as 1. After that, the control proceeds to a step S341 where an AI abnormality flag XAING is set as 1, whereby the determination processings illustrated in FIG. 5 are terminated.

If the control has proceeded to the step S330 due to a determination that the line is clogged, a line clogging flag XAIJAM is set as 1 and the flag XASVOK indicating that the ASV is normal is set as 1. Then, the control proceeds to a step S331 where a determination on the value of the flag F4 is made. If the value of the flag F4 is 1, it is determined that the mode 1' has been entered, and the control proceeds to a step S332 where the AP normality flag XAPOK is set as 1. Then, the control proceeds to the step S341 where the AI abnormality flag XAING is set as 1, whereby the determination processings illustrated in FIG. 5 are terminated. If the value of the flag F4 is 0 in the step S331, it is determined that the mode 4' has been entered, and the control proceeds to the step S340 where the ON abnormality flag XFAPON of the AP 12 is set as 1. Then, the control proceeds to the step S341 where the AI abnormality flag XAING is set as 1, whereby the determination processings illustrated in FIG. 5 are terminated.

If the control has proceeded to the step S320 due to a determination that the mode 3 or 6 has been entered, a closing malfunction flag XFASVCL of the ASV 13 is set as 1. Then, the control proceeds to a step S331 where a determination on the value of the flag F4 is made. In the case of the mode 3, since the flag 4 assumes a value of 1, the control proceeds to the step S332 where the AP normality flag XAPOK is set as 1. Then, the control proceeds to the step S341 where the AI abnormality flag XAING is set as 1, whereby the determination processings illustrated in FIG. 5 are terminated. In the case of the mode 6, on the other hand, since the flag F4 assumes a value of 0, the control proceeds from the step S331 to the step S332 where the ON abnormality flag XFAPON of the AP 12 is set as 1. Then, the control proceeds to the step S341 where the AI abnormality flag XAING is set as 1, whereby the determination processings illustrated in FIG. 5 are terminated.

If the control has proceeded to the step S310 due to a determination that the mode 2 or 5 has been entered, the opening malfunction flag XFASVOP of the ASV 13 is set as 1. Then, the control proceeds to a step S331 where a determination on the value of the flag F4 is made. In the case of the mode 2, since the flag F4 assumes a value of 1, the control proceeds to the step S332 where the AP normality flag XAPOK is set as 1. Then, the control proceeds to the step S341 where the AI abnormality flag XAING is set as 1, whereby the determination processings illustrated in FIG. 5 are terminated. In the case of the mode 5, on the other hand, since the flag F4 assumes a value of 0, the control proceeds from the step S331 to the step S323 where the ON abnormality flag XFAPON of the AP 12 is set as 1. Then, the control proceeds to the step S341 where the AI abnormality flag XAING is set as 1, whereby the determination processings illustrated in FIG. 5 are terminated.

If the control has proceeded to a step S350 due to a determination that the mode 7 or 8 has been entered, an OFF abnormality flag XFAPOFF of the AP 12 is set as 1, and a determination on the value of the flag F4 is made subsequently (in a step S351). If the value of the flag F4 is 0, it is determined that the mode 8 has been entered, and the control proceeds to a step S352 where the opening malfunction flag XFASVOP of the ASV 13 is set as 1. Then, the control proceeds to the step S331 where the AI abnormality flag XAING is set as 1, whereby the determination processings illustrated in FIG. 5 are terminated. If the value of the flag F4 is 1, it is determined that the mode 7 has been entered, and the control proceeds to a step S353 where the flag XASVOK indicating that the ASV is normal is set as 1. Then, the control proceeds to the step S341 where the AI abnormality flag XAING is set as 1, whereby the determination processings illustrated in FIG. 5 are terminated.

If it is determined in the step S301 that the flag F1 indicates 0, it is determined that the mode 9 or 10 has been entered. However, since it is difficult to distinguish, from the value of the pressure sensor 15, between the modes 9 and 10, the control proceeds to a step S360 where the closing malfunction flag XFASVCL of the ASV 13, the OFF abnormality flag XFAPOFF of the AP 12, and the abnormality flag XFPRESS of the pressure sensor 15 are set as 1 respectively. Then, the control proceeds to the step S341 where the AI abnormality flag XAING is set as 1, whereby the determination processings illustrated in FIG. 5 are terminated.

Figure 6:
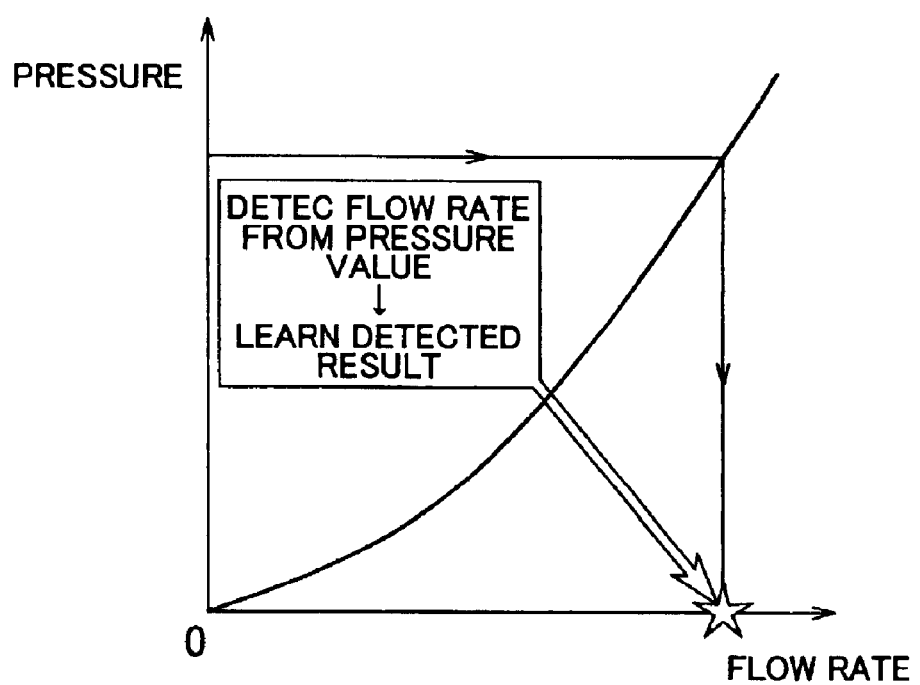
FIG. 6 is a diagram showing a relationship between the discharge pressure and flow rate of an air pump.
Figure 7:
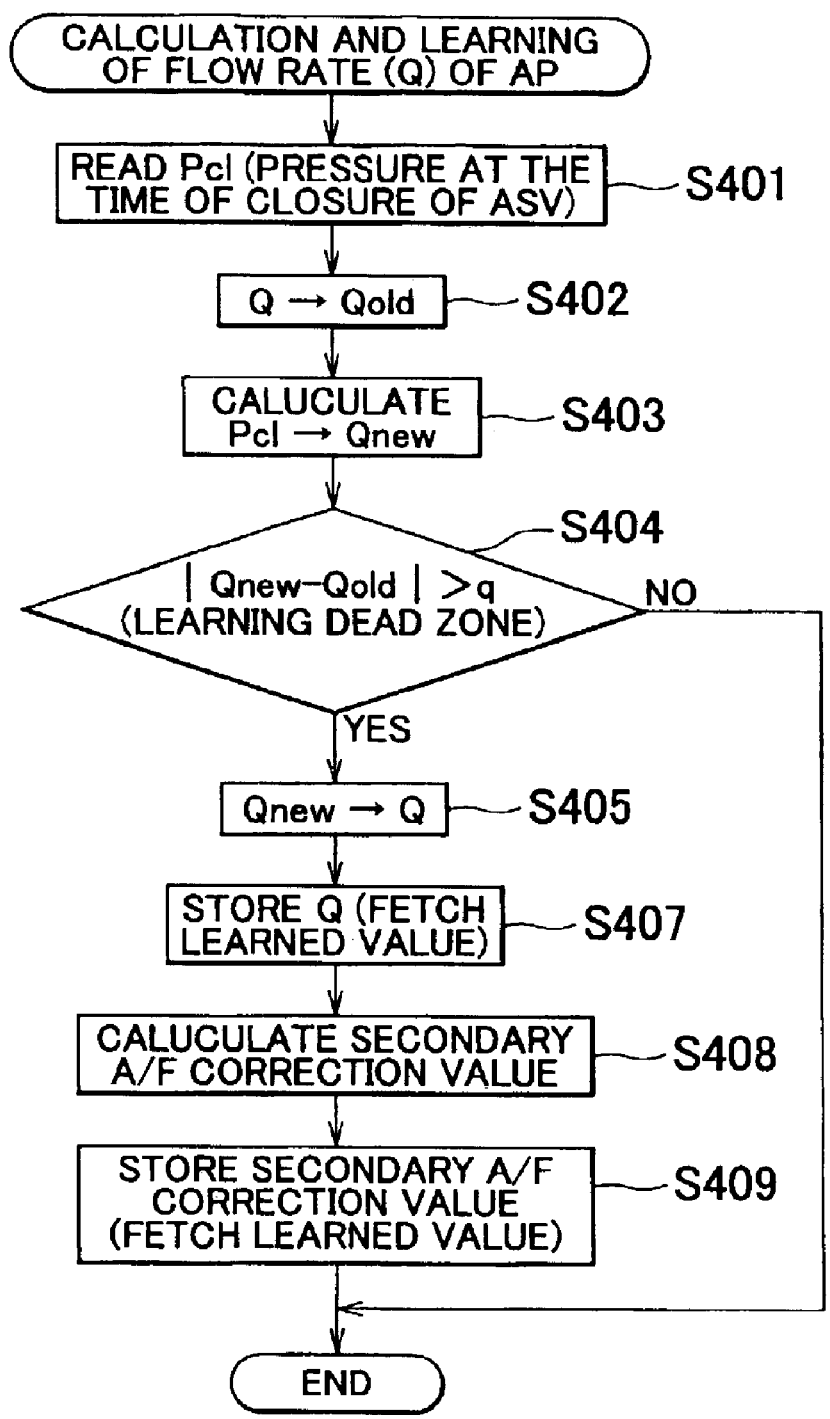
FIG. 7 is a flowchart showing processings of calculating and learning the flow rate of the air pump.

Next, the processings of calculating and learning the flow rate of the AP 12 in the step S307 will be described in detail with reference to FIGS. 6 and 7. FIG. 6 is a diagram showing a relationship between the discharge pressure and flow rate of the AP 12. FIG. 7 is a flowchart of the processings of calculating and learning flow rate.

In a step S401, first of all, a pressure value Pc1 during the operation of the AP 12 and during the shutoff of the ASV 13 as stored in the step S211 is read out. In a step S402, a variable Q is stored into Qold. In a step S403 succeeding the step S402, a diagram of a relationship between discharge pressure and flow rate as illustrated in FIG. 6 is prepared in advance, and a flow rate Qnew is calculated from the pressure value Pc1 with reference to the diagram. In a step S404, the absolute value of a difference between Qnew and Qold is compared with a threshold q. Only if the absolute value of the difference is larger than the threshold q, the control proceeds to a step S405 where the variable Q is updated by Qnew. If the absolute value of the difference is equal to or smaller than the threshold q, the value Q is held as it is (remains equal to Qold). Therefore, the control is terminated with the subsequent processings being skipped.

In a step S407, subsequently, the updated value of the variable Q is stored into a non-volatile memory or the like disposed inside the control unit 10. Then in a step S408, a secondary A/F correction value is calculated (updated). In a step S409, the updated secondary A/F correction value is stored into the non-volatile memory or the like disposed inside the control unit 10, whereby the processings illustrated in FIG. 7 are terminated.

As described hereinbefore, this secondary air feeding apparatus makes it possible to precisely detect which sort of malfunction is developed by the components, and therefore, to realize reliable diagnosis of malfunctions.

Figure 8:
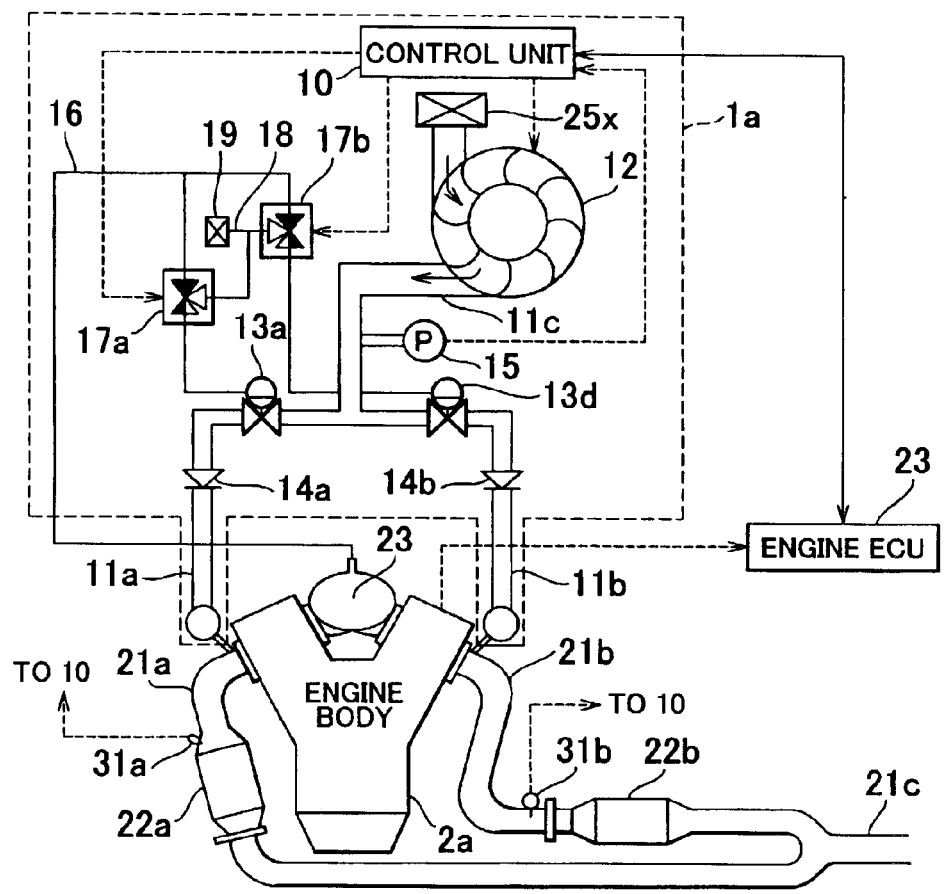
FIG. 8 is a schematic view of the arrangement of a secondary air feeding apparatus in accordance with a second embodiment of the invention.

Next, a secondary air feeding apparatus in accordance with the second embodiment of the invention will be described. Referring to FIG. 8, a secondary air feeding apparatus 1a of the second embodiment is different from the secondary air feeding apparatus 1 of the first embodiment in that the apparatus 1a is mounted on a V-type engine 2a whose cylinders are arranged in the shape of "V".

An exhaust system of the engine 2a has two exhaust pipes 21a and 21b. The exhaust pipe 21a is connected to the cylinders of one bank, while the exhaust pipe 21b is connected to the cylinders of the other bank. Exhaust gas purification units 22a and 22b constructed of three-way catalysts are disposed in the exhaust pipes 21a and 21b respectively. $O_2$ sensors 31a and 31b are disposed upstream of the exhaust gas purification units 22a and 22b respectively. The exhaust pipes 21a and 21b converge into an exhaust pipe 21c downstream of the exhaust gas purification units 22a and 22b respectively.

In order to supply these two exhaust pipes 21a and 21b with secondary air, the secondary air feeding apparatus 1a is different from the aforementioned secondary air feeding apparatus 1 in the following respects. First of all, the secondary air feeding passage 11 has a main passage 11c on the upstream side and branch passages 11a and 11b. The main passage 11c diverges into the branch passages 11a and 11b downstream of the AP 12. The branch passages 11a and 11b are connected to the exhaust pipes 21a and 21b respectively. ASV's 13a and 13b and RV's 14a and 14b are disposed in the branch passages 11a and 11b respectively. The line 16 also diverges into two branch lines in which three-way valves 17a and 17b are disposed respectively. Lines extending from the three-way valves 17a and 17b are connected to the ASV's 13a and 13b respectively. The pressure sensor 15 is disposed in the main passage 11c at a position downstream of the AP 12.

Owing to this arrangement, the opening and closing of the ASV's 13a and 13b can be controlled independently of each other by controlling the three-way valves 17a and 17b respectively. As a result, the supply of secondary air to the exhaust pipes 21a and 21b can be controlled to be permitted or prohibited independently of each other.

The secondary air feeding apparatus 1a also has the function of detecting the abnormalities in the AP 12 and the ASV's 13a and 13b. More specifically, the control unit 10 performs detection of the abnormalities in the components on the basis of pressure behaviors that are detected by the pressure sensor 15 disposed in the secondary air feeding passage 11. Hereinafter, the routine of the abnormality detection processings performed by this apparatus will be described.

Figure 9:
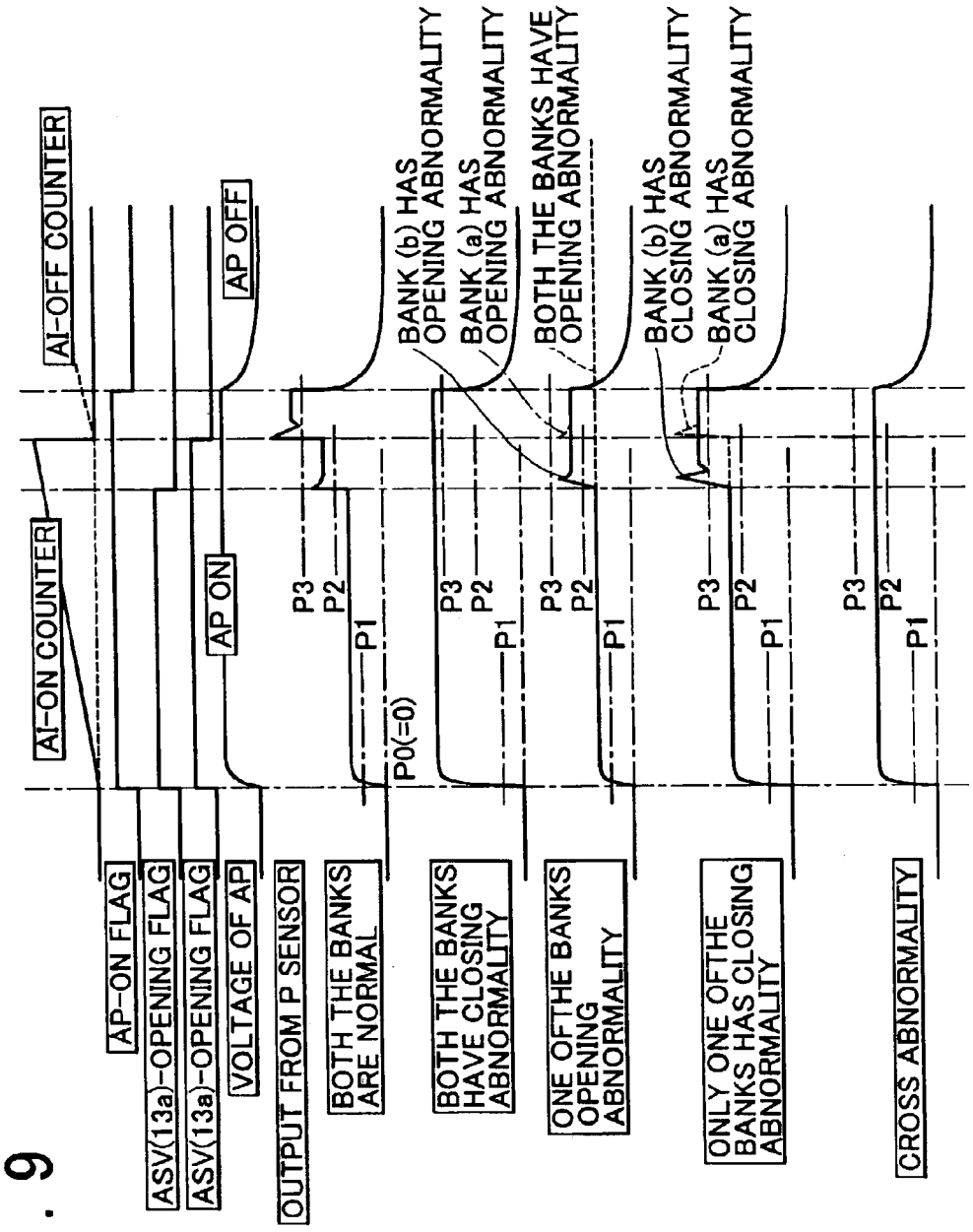
FIG. 9 is a time chart illustrating how pressure changes measured by a pressure sensor from a timing when the apparatus shown in FIG. 1 has not been operated yet to a timing when the apparatus shown in FIG. 1 has been stopped differ depending on the operational states of respective components.
Figure 10A:
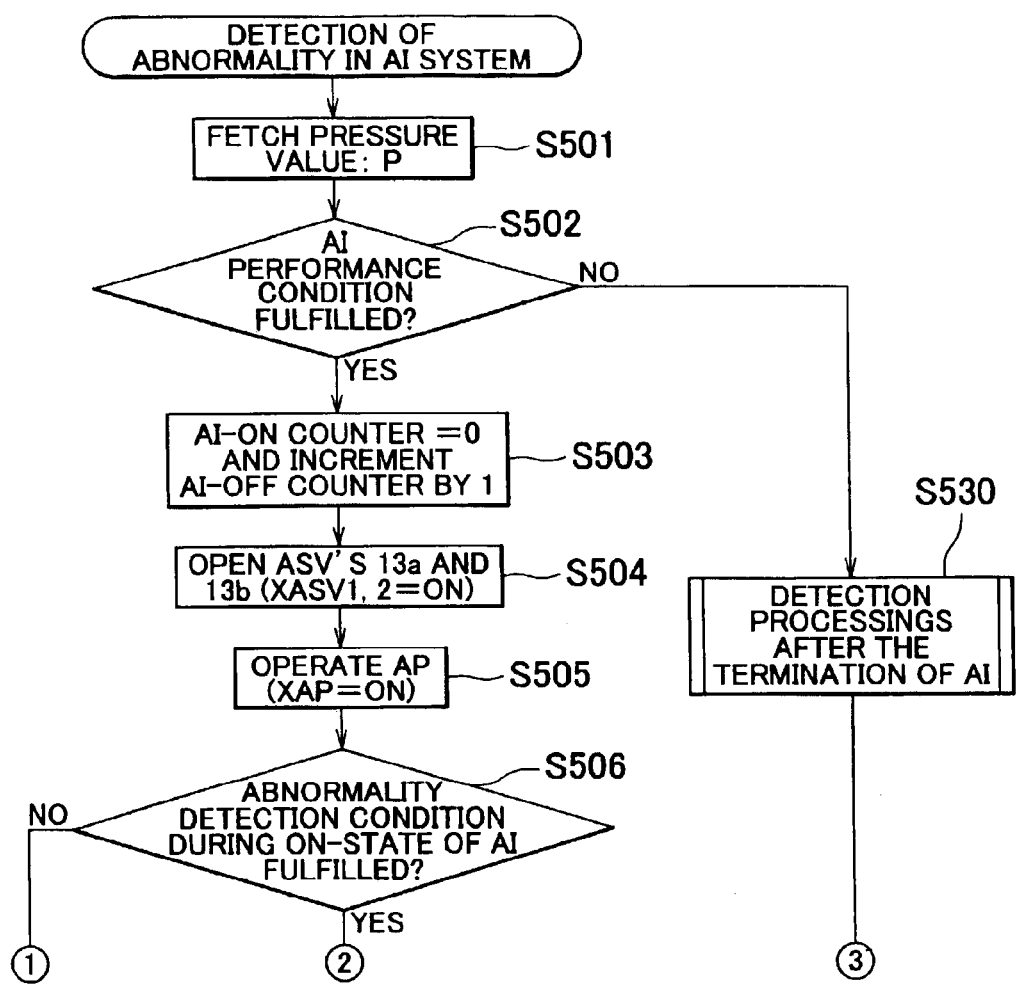
FIG. 10 is a flowchart showing main processings for detecting abnormality in the apparatus shown in FIG. 8.
Figure 11A:
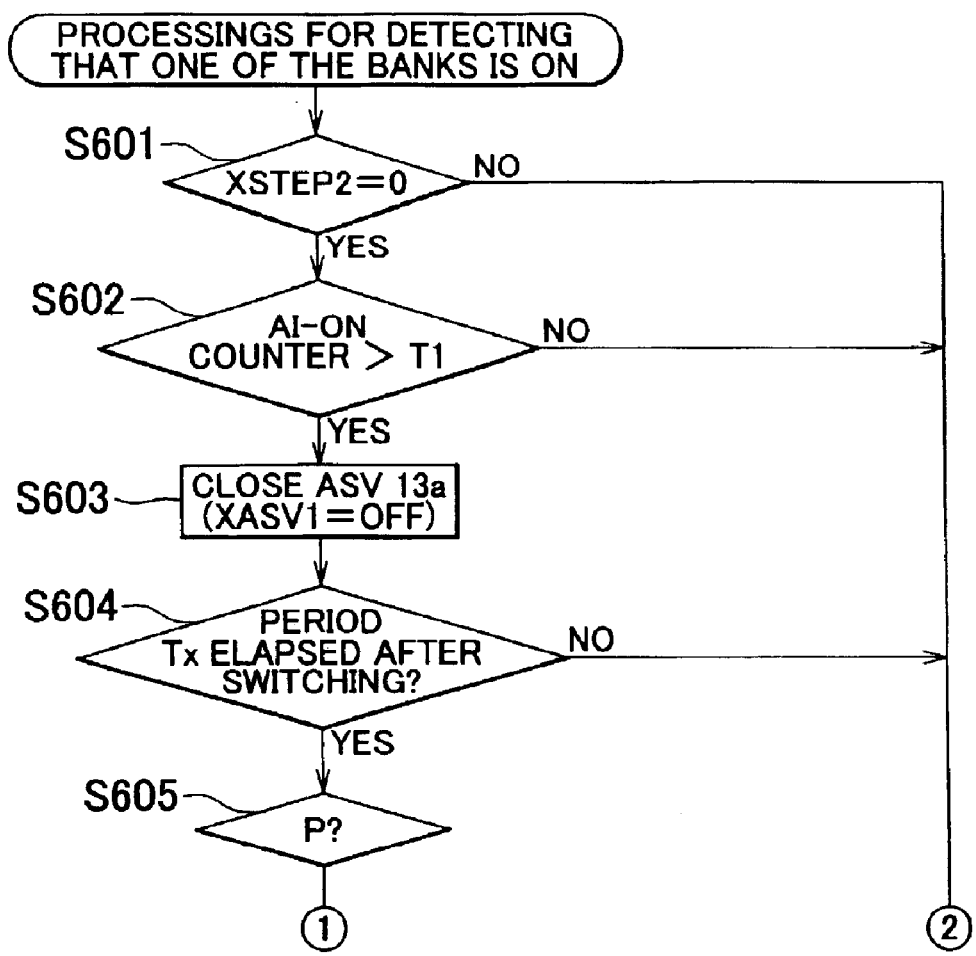
FIG. 11 is a flowchart showing pressure detection processings while one bank of the apparatus shown in FIG. 8 is in operation.
Figure 11B:
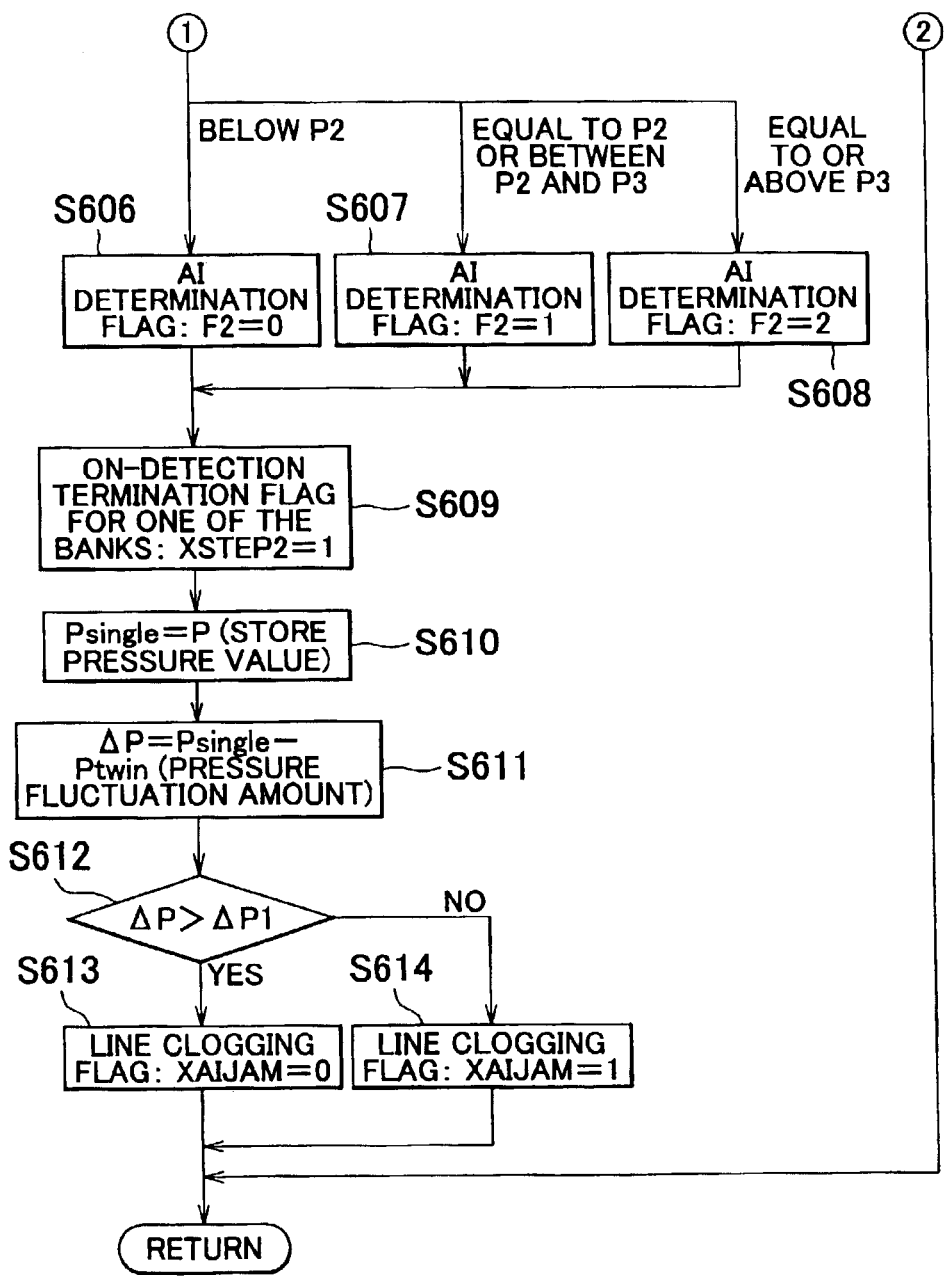
Figure 12A:
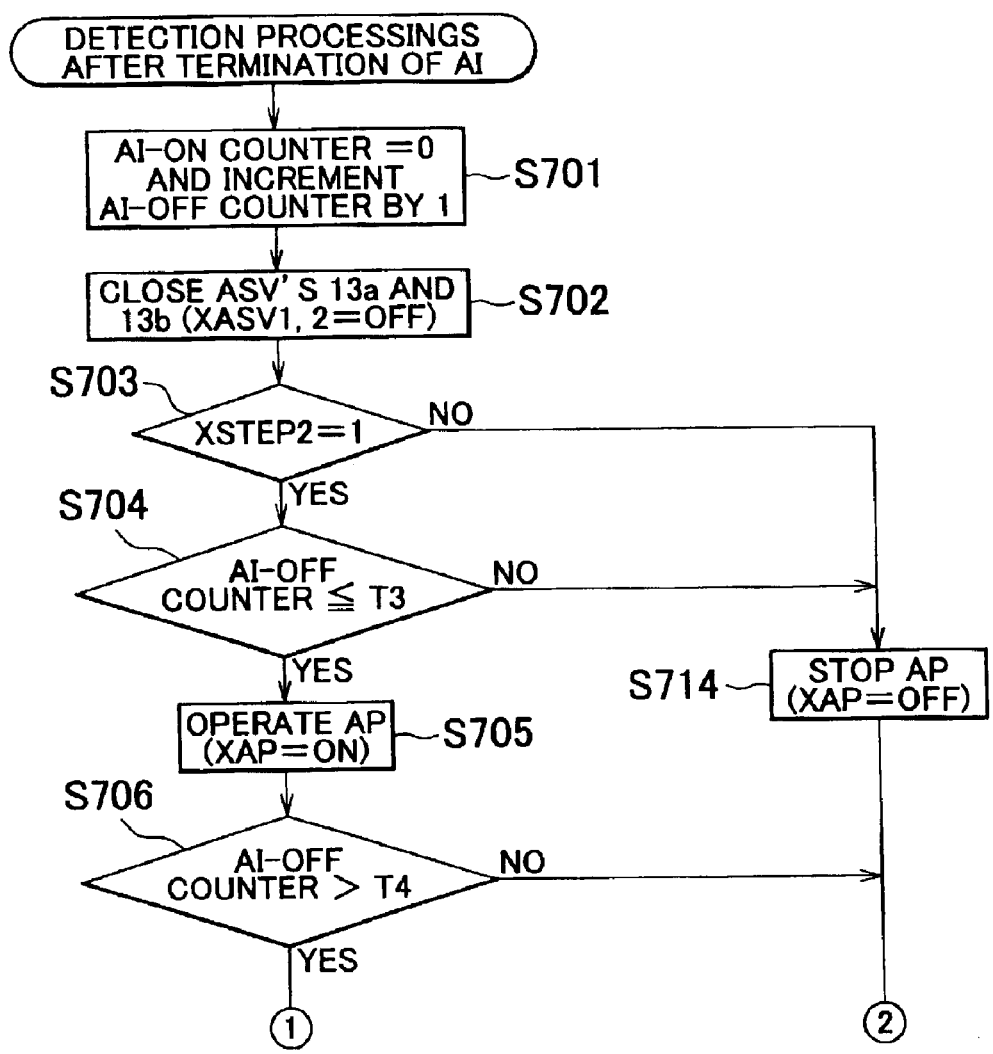
FIG. 12 is a flowchart showing pressure detection processings after the termination of AI of the apparatus shown in FIG. 8.
Figure 12B:
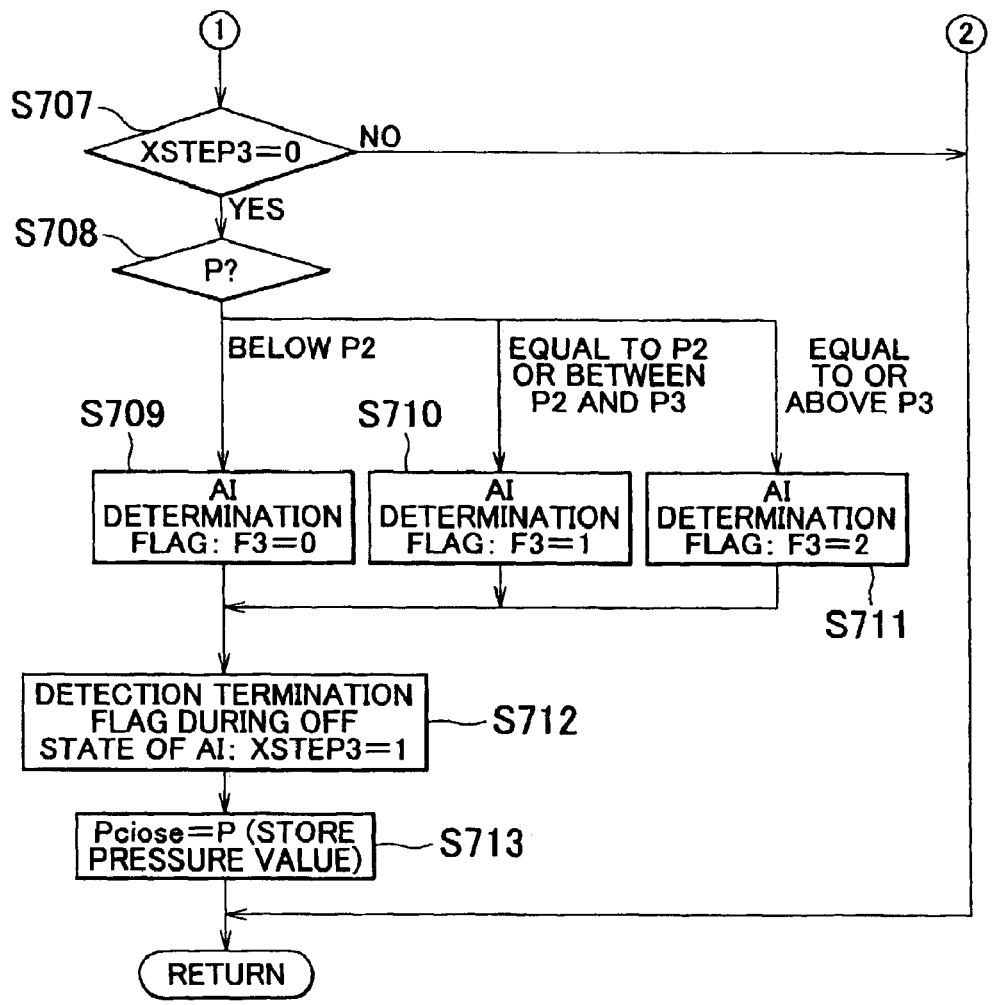
Figure 13A:
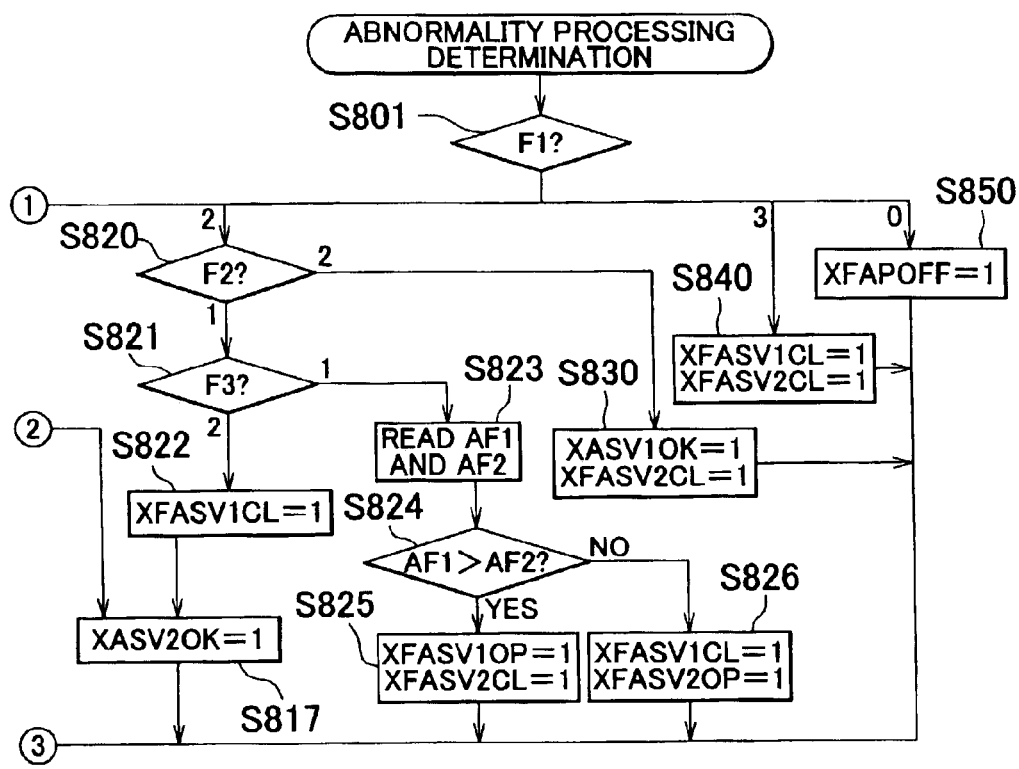
FIG. 13 is a flowchart showing processings of making a determination on the abnormality in the apparatus shown in FIG. 8.
Figure 13B:
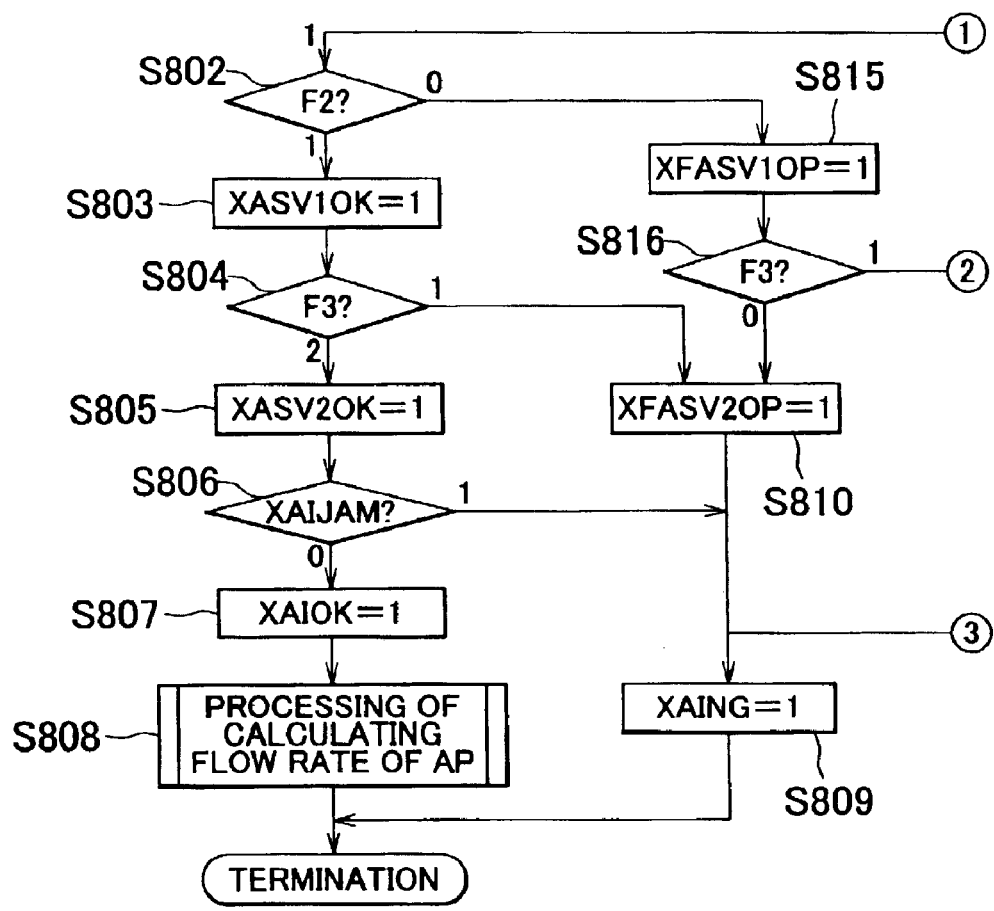

FIG. 9 is a time chart illustrating how pressure changes measured by the pressure sensor 15 from a timing when the secondary air feeding (AI) system has not been operated yet to a timing when the secondary air feeding (AI) system has been stopped differ depending on the operational states of respective components. FIGS. 10 to 13 are flowcharts of abnormality detection processings. FIG. 10 is the flowchart showing main processings of detection. FIG. 11 is the flowchart showing pressure detection processings while one bank of the system is in operation. FIG. 12 is the flowchart showing pressure detection processings after the termination of AI. FIG. 13 is the flowchart showing abnormality determination processings.

First of all, the main processings illustrated in FIG. 10 will be described. In a step S501, a pressure value P as an output value of the pressure sensor 15 is fetched. At this moment, as is the case with the aforementioned processing in the step S102, it is also appropriate that a temporal average Pm between the pressure value P and an output value within a predetermined period in the past be calculated.

It is checked in a step S502 whether or not an AI performance condition has been fulfilled. This performance condition is equivalent to the aforementioned performance condition in the step S103. Herein, if it is determined that there is no need to perform AI because the AI performance condition has not been fulfilled, the control proceeds to a step S530 that will be described later. If the performance of AI is to be required later although the AI performance condition has not been fulfilled yet, the control waits in the step S502 until the condition is fulfilled. If the AI performance condition has been fulfilled, the control proceeds to a step S503.

In the step S503, the AI-OFF counter is reset as 0 and the AI-ON counter is incremented by 1. Then, the ASV's 13a and 13b are controlled to be opened (in a step S504), and a command to operate the AP 12 is issued (in a step S505). Owing to a command to open the ASV's 13a and 13b, the three-way valves 17a and 17b introduce a negative pressure in the intake pipe 20 into the ASV's 13a and 13b, respectively, through the line 16. Therefore, if the ASV's 13a and 13b are closed, they are switched into open states. Then, by operating the AP 12, part of air flowing through the air filter 25 via the secondary air feeding passages 11a and 11b is introduced into the exhaust pipes 21a and 21b respectively. In other words, secondary air is supplied.

It is checked in a step S506 whether or not an abnormality detection condition during the operation of AI has been fulfilled. This abnormality detection condition is also equivalent to the aforementioned abnormality detection condition in the step S107. If the abnormality detection condition has been fulfilled, the control proceeds to a step S507 so as to detect pressure behaviors during feeding control. If the abnormality detection condition has not been fulfilled, the control is terminated with the subsequent processings being skipped.

It is determined in a step S507 whether or not the pressure detection termination flag XSTEP1 during the operation of AI indicates 0 as a value indicative of the incompletion of detection. If the pressure detection termination flag XSTEP1 indicates 0 as a value indicative of the incompletion of detection, the control proceeds to a step S508 so as to carry out detection. If the pressure detection termination flag XSTEP1 indicates 1 as a value indicative of the completion of detection, one-bank ON detection processings (in a step S520) are performed. These processings will be described later in detail.

In a step S508, a determination on the pressure value P detected in the step S501 is initially made. More specifically, it is determined how the pressure value P is related to three thresholds P1, P2, and P3 (n.b., P1<P2<P3). If the AP 12 is functioning normally, the pressure value P ought to increase as shown in FIG. 2. In addition, if the branch passage 11a for one bank or the branch passage 11b for the other bank is blocked (including abnormalities in the ASV's 13a and 13b and the RV's 14a and 14b), the pressure value P is higher in comparison with a case where both the passages are normal. If both the passages are abnormal, the pressure value P ought to be higher in comparison with a case where one of them is abnormal.

Therefore, if the pressure value P is below the predetermined threshold P1, the control proceeds to a step S509 where the AI determination flag F1 is set as 0, which is a value indicating that the AP 12 is abnormal. If the pressure value P is equal to P1 or between P1 and P2, it is determined that the AP 12 is in operation and that none of the banks are blocked. Then, the control proceeds to a step S510 where the AI determination flag F1 is set as 1, which is a value indicating that the AP 12 is in operation and that none of the banks are blocked. If the pressure value P is equal to P2 or between P2 and P3, it is determined that one of the banks is blocked although the AP 12 is in operation. Then, the control proceeds to a step S511 where the AI determination flag F1 is set as 2, which indicates that the AP 12 is in operation and that one of the banks is blocked. If the pressure value P is equal to or higher than P3, it is determined that both the banks are blocked although the AP 12 is in operation. Then, the control proceeds to a step S512 where the AI determination flag F1 is set as 3, which is a value indicating that the AP 12 is in operation and that both the banks are blocked.

After the AI determination flag F1 has been set in one of the steps S509 to S512, the control proceeds to a step S513 where the pressure detection termination flag XSTEP1 during the operation of AI (when both the banks are ON) is set as 1. Then, the pressure P during operation is stored into a variable Ptwin (in a step S514), whereby the processings illustrated in FIG. 10 are terminated.

If it is determined in the step S502 that the AI performance condition has not been fulfilled, the control proceeds to a step S530 where pressure detection processings after the termination of AI as described later are performed, whereby the processings illustrated in FIG. 10 are terminated.

Next, the one-bank ON detection processings in the step S520 will be described. As shown in FIG. 11, first of all, it is determined in a step S601 whether or not a termination flag XSTEP2 of the one-bank ON detection processings indicates 0 as a value indicative of incompletion. If the termination flag XSTEP2 indicates 1, the control is terminated with the subsequent processings being skipped, because detection has already been completed. If the termination flag XSTEP2 indicates 0, the value of the AI-ON counter is compared with a threshold T1 in a step S602 succeeding the step S601. If the value of the AI-ON counter is equal to or smaller than the threshold T1, the control is terminated with the subsequent processings being skipped. If the value of the AI-ON counter is above the threshold T1, it is determined that a deterioration in exhaust emission properties can be suppressed even if one of the banks is stopped, and the control proceeds to a step S603.

In the step S603, only the ASV 13a is controlled to be shut off. More specifically, the three-way valve 17a is switched and outside air is introduced into the ASV 13a through the filter 19 and the line 18, so that the operation of the ASV 13a is switched to shutoff (the ASV 13a will be held shut off if it has already been shut off). In a step S604 succeeding the step S603, it is determined whether or not a time tx has elapsed after the issuance of a command to switch the ASV 13a to shutoff. If the time tx has not elapsed after the issuance of the command to switch the ASV 13a to shutoff, the pressure may be unstable because the switching operation has just been performed. Therefore, the control is terminated with the subsequent processings being skipped.

If a time equal to or longer than tx has elapsed after the issuance of the command to switch the ASV 13a, the control proceeds to a step S605. In the step S605, a determination on the pressure value P is made. More specifically, it is determined how the pressure value P is related to the thresholds P2 and P3 mentioned above. If the pressure value P is below P2, the control proceeds to a step S606 where the AI determination flag F2 is set as 0. If the pressure value P is equal to P2 or between P2 and P3, the control proceeds to a step S607 where the AI determination flag F2 is set as 1. If the pressure value P is equal to or higher than P3, the control proceeds to a step S608 where the AI determination flag F2 is set as 2. After the AI determination flag F2 has been set, the control proceeds to a step S609 where the pressure detection termination flag XSTEP2 during one-bank ON control is set as 1.

In a step S610 succeeding the step S609, the current pressure value P is stored into a variable Psingle. In a step S611, a difference ΔP between the pressure value P and the value of Ptwin calculated in the step S514 is calculated. In a step S612, the calculated difference ΔP is compared with a predetermined threshold ΔP1.

If the difference ΔP is above the predetermined threshold ΔP1, the line clogging flag XAIJAM is set as 0 on the ground that the line is not clogged, and the processings illustrated in FIG. 11 are terminated. If the difference ΔP is equal to or smaller than the predetermined threshold ΔP1, the line may be clogged. Therefore, the line clogging flag XAIJAM is set as 1, and the processings illustrated in FIG. 11 are terminated.

Next, the detection processings after the termination of AI in the step S530 will be described. As shown in FIG. 12, first of all in a step S701, the AI-ON counter is reset as 0 and the AI-OFF counter is incremented by 1. Then, both the ASV's 13a and 13b are controlled to be shut off in a step S702. In general, the ASV 13a has already been controlled to be closed, and the ASV 13b is further closed. Concretely, the three-way valve 17b is switched and outside air is introduced into the ASV 13b through the filter 19 and the line 18, whereby the operation of the ASV 13b is switched to shutoff (the ASV 13b will be held shut off if it has already been shut off).

In a step S703 succeeding the step S702, it is determined whether or not the termination flag XSTEP2 of the one-bank ON detection processings indicates 1 as a value indicative of completion. If the termination flag XSTEP2 indicates 0, it is determined that the condition for the detection processings after the termination of AI has not been fulfilled, and the control is terminated with the subsequent processings being skipped. If the termination flag XSTEP2 indicates 1, the value of the AI-OFF counter is compared with the threshold T3 in a step S704 succeeding the step S703. If the value of the AI-OFF counter is above the threshold T3, it is determined that the condition for the detection processings after the termination of AI has not been fulfilled, and the control proceeds to a step S714 where the AP 12 is stopped. Then, the control is terminated with the subsequent processings being skipped. If the value of the AI-OFF counter is equal to or smaller than the threshold T3, the control proceeds to a step S705 where the AP 12 is operated. Because the AP 12 is usually in operation, it will be held in operation.

In a subsequent step S706, the value of the AI-OFF counter is compared with the threshold T4. It is to be noted herein that there is established a relationship T4<T3. If the value of the AI-OFF counter is equal to or smaller than the threshold T4, it is determined that the condition for the detection processings after the termination of AI has not been fulfilled, and the control is terminated with the subsequent processings being skipped.

In a step S707 succeeding the step S706, it is determined whether or not the termination flag XSTEP3 of the detection processings after the termination of AI indicates 0 as a value indicative of incompletion. If the termination flag XSTEP3 indicates 1, the control is terminated with the subsequent processings being skipped. If the termination flag XSTEP3 indicates 0, a determination on the pressure value P is made in a step S708 succeeding the step S707. More specifically, it is determined how the pressure value P is related to the aforementioned thresholds P2 and P3. If the pressure value P is below P2, the control proceeds to a step S709 where the AI determination flag F3 is set as 0. If the pressure value P is equal to P2 or between P2 and P3, the control proceeds to a step S710 where the AI determination flag F3 is set as 1. If the pressure value P is equal to or higher than P3, the control proceeds to a step S711 where the AI determination flag F3 is set as 2. After the AI determination flag has been set, the control proceeds to a step S712 where the pressure detection termination flag XSTEP3 after the termination of AI is set as 1. Then, the current pressure value P is stored into a variable Pclose in a step S713, whereby the processings illustrated in FIG. 12 are terminated.

According to the aforementioned processings, the AI determination flags F1 to F3 are set as flag values corresponding to respective operational states. Herein, a table 2 below illustrates how the values of the flags are related to the normality or abnormality of the components concerned.

TABLE 2

| MALFUNCTION MODE | ASV1 | ASV2 | F1 | F2 | F3 |
|---|---|---|---|---|---|
| 1 | NORMAL | NORMAL | 1 | 1 | 2 |
| 2 |  | OPENING MALFUNCTION | 1 | 1 | 1 |
| 3 |  | CLOSING MALFUNCTION | 2 | 2 | 2 |
| 4 | OPENING MALFUNCTION | NORMAL | 1 | 0 | 1 |
| 5 |  | OPENING MALFUNCTION | 1 | 0 | 0 |
| 6 |  | CLOSING MALFUNCTION | 2 | 1 | 1 |
| 7 | CLOSING MALFUNCTION | NORMAL | 2 | 1 | 2 |
|  |  | OPENING | 2 | 1 | 1 |
| 8 |  | MALFUNCTION CLOSING | 3 | 2 | 2 |

TABLE 2-continued

| MALFUNCTION MODE | ASV1 | ASV2 | F1 | F2 | F3 |
|---|---|---|---|---|---|
| 9 | | MALFUNCTION | | | |
| 10 | INOPERATIVE STATE OF AP | | 0 | 0 | 0 |

Abnormality determination processings shown in FIG. 13 are intended to specify which one of the components is subjected to a malfunction with reference to the values of the flags in the above table.

First of all in a step S801, a determination on the value of the flag F1 is made. If the value of the flag F1 is 0, it is determined that the mode 10 has been entered, namely, that the AP 12 is out of operation, and the control proceeds to a step S850. If the value of the flag F1 is 1, it is determined that one of the modes 1, 2, 4 and 5 has been entered, namely, that both the ASV's 13a and 13b are open during opening control, and the control proceeds to a step S802. If the value of the flag F1 is 2, it is determined that one of the modes 3 and 6 to 8 has been entered, namely, that the AP 12 is in operation with only one of the ASV's 13a and 13b being closed during opening control, and the control proceeds to a step S820. If the value of the flag F1 is 3, it is determined that the mode 9 has been entered, namely, that the AP 12 is in operation with both the ASV's 13a and 13b being closed during opening control, and the control proceeds to a step S840.

In the step S802, a determination on the value of the flag F2 is made. If the value of the flag F2 is 1, it is determined that the ASV 13a is in one of the normal modes 1 and 2, and the control proceeds to a step S803. If the value of the flag F2 is 0, it is determined that the ASV 13a is in one of the modes 4 and 5 corresponding to opening malfunction states, and the control proceeds to a step S815 that will be described later.

In the step S803, a flag XASV1OK indicating that the ASV 13a is functioning normally is set as 1. In a step S804 succeeding the step S803, a determination on the value of the flag F3 is made. If the value of the flag F3 is 2, it is determined that the mode 1 has been entered, namely, that the ASV 13b is in normal operation as well, and the control proceeds to a step S805. If the flag F3 indicates 1, it is determined that the mode 2 has been entered, namely, that the ASV 13b has an opening malfunction, and the control proceeds to a step S810 that will be described later.

In a step S806, a determination on the set value of the flag XAIJAM is made. If the flag XAIJAM indicates 0, it is determined that clogging has not been caused, and the control proceeds to a step S807 where the AI normality flag XAIOK is set as 1. Then in a step S808, the processing of calculating and learning the flow rate of the AP is performed, whereby the determination processings illustrated in FIG. 13 are terminated. If the set value of the flag XAIJAM is 1 in the step S806, it is determined that the line has been clogged. Then, the control proceeds to a step S809 where the AI abnormality flag XAING is set as 1, whereby the determination processings illustrated in FIG. 13 are terminated.

If the control has proceeded to the step S810 due to the determination that the mode 2 has been entered, an opening malfunction flag XFASV2OP of the ASV 13b is set as 1. Then, the control proceeds to the step S809 where the AI abnormality flag XAING is set as 1, whereby the determination processings illustrated in FIG. 13 are terminated.

If the control has proceeded to a step S815 due to the determination that one of the modes 4 and 5 has been entered, the opening malfunction flag XFASV1OP of the ASV 13a is set as 1, and the control proceeds to a step S816 where a determination on the value of the flag F3 is made. If the flag F3 indicates 0, it is determined that the mode 5 has been entered, and the control proceeds to the step S810 where the opening malfunction flag XFASV2OP of the ASV 13b is set as 1. Then, the control proceeds to the step S809 where the AI abnormality flag XAING is set as 1, whereby the determination processings illustrated in FIG. 13 are terminated. If the flag F3 indicates 1, it is determined that the mode 4 has been entered. Then, the control proceeds to a step S817 where a flag XASV2OK indicating that the ASV 13b is in normal operation is set as 1. The control further proceeds to the step S809 where the AI abnormality flag XAING is set as 1, whereby the determination processings illustrated in FIG. 13 are terminated.

If the control has proceeded to the step S820 due to the determination that one of the modes 3 and 6 to 8 has been entered, a determination on the value of the flag F2 is made. If the value of the flag F2 is 1, it is determined that one of the modes 6 to 8 has been entered, namely, that the ASV 13a has a malfunction, and the control proceeds to a step S821. If the value of the flag F2 is 2, it is determined that the mode 3 has been entered, and the control proceeds to a step S830 where the flag XASV1OK indicating that the ASV 13a is functioning normally is set as 1 and a closing malfunction flag XFASV2CL of the ASV 13b is set as 1. Then, the control proceeds to the step S809 where the AI abnormality flag XAING is set as 1, whereby the determination processings illustrated in FIG. 13 are terminated.

In the step S821, a determination on the value of the flag F3 is made. If the value of the flag F3 is 2, it is determined that the mode 7 has been entered, and the control proceeds to a step S822 where a closing malfunction flag XFASV1CL of the ASV 13a is set as 1. Then, the control proceeds to the step S817 where the flag XASV2OK indicating that the ASV 13b is functioning normally is set as 1. After that, the control proceeds to the step S809 where the AI malfunction flag XAING is set as 1, whereby the determination processings illustrated in FIG. 13 are terminated.

If the value of the flag F3 is 1, the mode 6 or 8 has been entered. This means that a cross malfunction has been caused. More specifically, one of the banks is closed and the other bank is normally open. However, since it cannot be determined from the behavior of the pressure value which one of the banks is closed, A/F values measured by the $O_2$ sensors 31a and 31b in the exhaust pipes 21a and 21b respectively during the operation of AI are read out in a step S823, and the values thus read out are compared with each other in a step S824. If the A/F value on the side of the exhaust pipe 21a signifies a lean state of the mixture, it is determined that communication on the side of the branch passage 11a has been established, and the control proceeds to a step S825 where the opening malfunction flag XFASV1OP of the ASV 13a is set as 1 and the closing malfunction flag XFASV2CL of the ASV 13b is set as 1. Then, the control proceeds to the step S809 where the AI abnormality flag XAING is set as 1, whereby the determination processings illustrated in FIG. 13 are terminated. On the contrary, if the A/F value on the side of the exhaust pipe 21b signifies a lean state of the mixture, it is determined that communication on the side of the branch passage 11b has been established, and the control proceeds to a step S826 where the closing malfunction flag XFASV1CL of the ASV 13a is set as 1 and the opening malfunction flag XFASV2OP of the ASV 13b is set as 1. Then, the control proceeds to the step S809 where the AI abnormality flag XAING is set as 1, whereby the determination processings illustrated in FIG. 13 are terminated.

If the control has proceeded to the step S840 due to the determination that the mode 9 has been entered, the closing malfunction flag XFASV1CL of the ASV 13a and the closing malfunction flag XFASV2CL of the ASV 13b are set as 1. Then, the control proceeds to the step S809 where the AI abnormality flag XAING is set as 1, whereby the determination processings illustrated in FIG. 13 are terminated.

If the control has proceeded to the step S850 due to the determination that the mode 10 has been entered, the OFF malfunction flag XFAPOFF of the AP 12 is set as 1. Then, the control proceeds to the step S809 where the AI abnormality flag XAING is set as 1, whereby the determination processings illustrated in FIG. 13 are terminated.

In the foregoing description, a determination on a normal operation malfunction of the AP 12 is omitted. However, this determination on the malfunction can be made by determining, after the ASV's 13a and 13b have been closed, whether or not there is a difference between the pressure value before the switching of the AP 12 from operation control to stoppage control and the pressure value after the switching of the AP 12 from operation control to stoppage control. This determination can also be made from changes in the voltage applied to the AP 12.

In the foregoing description, the V-type engine whose cylinders are arranged in the shape of "V" is cited as an example. However, the invention is also applicable to horizontal opposed engines or engines of other arrangement types as long as they adopt a construction wherein at least a plurality of exhaust gas purification units are disposed independent of one another, wherein secondary air feeding passages branching off from a main passage are connected upstream of the exhaust gas purification units respectively, and wherein secondary air is supplied through the secondary air feeding passages.

In either of the embodiments mentioned above, it is to be noted that the processing flowcharts are examples and that modifications for accomplishing equivalent functions are possible. For instance, the pressure of the ASV before the opening-closing switching thereof or the difference between the pressure before the opening-closing switching of the ASV and the pressure after the opening-closing switching of the ASV can be used as a threshold. Furthermore, although the determination is made herein on the basis of the pressures before and after the switching of the ASV in the closing direction while the AP is held in operation during the AI feed stoppage, it is also appropriate that the AP be operated prior to the opening control of the ASV at the beginning of AI feed, and that the determination be made on the basis of the pressures before and after the switching of the ASV in the opening direction. Alternatively, the determination can also be made by temporarily closing the ASV during operation.

As described hitherto, according to the invention, the secondary air feeding apparatus for supplying secondary air to the region upstream of the exhaust gas purification unit of the exhaust system is constructed such that the malfunction mode is specified by making a determination on the pressures before and after the opening-closing switching of the ASV by means of the pressure sensor disposed between the AP and the ASV and a determination on the difference between those pressures, whereby it becomes possible to make a precise determination on the abnormalities in the components.

What is claimed is:

1. A secondary air feeding apparatus, comprising:
   a secondary air feeding passage that supplies secondary air to a region upstream of an exhaust gas purification unit of an internal combustion engine;
   an air pump disposed in the secondary air feeding passage;
   an opening-closing portion which is disposed downstream of the air pump and which switches an opening-closing state of the secondary air feeding passage;
   a pressure sensor disposed between the air pump and the opening-closing portion, wherein the pressure sensor outputs pressure values; and
   an abnormality detection portion that detects abnormalities in components on the basis of an average of the pressure values, wherein the average is calculated based on the output pressure values detected by the pressure sensor within a predetermined period, before and after the switching of the opening-closing state of the opening-closing portion as detected by the pressure sensor during the operation of the air pump and on the basis of a difference between the average pressure values.

2. The secondary air feeding apparatus according to claim 1, further comprising:
   a check valve disposed downstream of the opening-closing portion.

3. A secondary air feeding apparatus, comprising:
   a secondary air feeding passage that supplies secondary air to a region upstream of an exhaust gas purification unit of an internal combustion engine;
   an air pump disposed in the secondary air feeding passage;
   an opening-closing portion which is disposed downstream of the air pump and which switches an opening-closing state of the secondary air feeding passage by means of an opening signal and a closing signal;
   a pressure sensor disposed between the air pump and the opening-closing portion; and
   an abnormality detection portion that detects, during the operation of the air pump, abnormalities in components of the secondary air feeding apparatus on the basis of an opening pressure value detected by the pressure sensor as a pressure value, after the receipt of the opening signal in the opening-closing portion, a closing pressure value detected by the pressure sensor as a pressure value after the receipt of the closing signal in the opening-closing portion, and a difference between the opening pressure value and the closing pressure value;
   wherein the opening pressure value and the closing pressure value are averages of pressure values detected by the pressure sensor within a predetermined period.

4. The secondary air feeding apparatus according to claim 3, further comprising:
   a check valve disposed downstream of the opening-closing portion.

5. The secondary air feeding apparatus according to claim 3, wherein
   the abnormality detection portion detects an abnormality in at least one of the secondary air feeding passage, the air pump, the opening-closing portion, and the pressure sensor.

6. The secondary air feeding apparatus according to claim 5, wherein if the opening pressure value is equal to or smaller than a first threshold, the abnormality detection portion detects that the air pump is abnormal.

7. The secondary air feeding apparatus according to claim 5, wherein
if a subsidiary closing pressure value detected by the pressure sensor as a pressure value after the receipt of a closing signal in the opening-closing portion is not substantially equal to 0 during the stoppage of the air pump, the abnormality detection portion detects that the air pump is abnormal.

8. The secondary air feeding apparatus according to claim 5, wherein
if the difference between the pressure values is smaller than a second threshold, the abnormality detection portion detects that the opening-closing portion is abnormal.

9. The secondary air feeding apparatus according to claim 5, wherein
the abnormality detection portion detects that the secondary air feeding passage is abnormal, if the opening pressure value is larger than a first threshold, the closing pressure value is larger than a third threshold, and the difference between the pressure values is within a predetermined range.

10. A secondary air feeding apparatus, comprising:
a secondary air feeding passage that supplies secondary air to a region upstream of a plurality of exhaust gas purification units that are arranged in association with one or more cylinders of a multi-cylinder internal combustion engine;
a main passage forming an upstream portion of the secondary air feeding passage;
a plurality of branch passages forming a downstream portion of the secondary air feeding passage;
an air pump disposed in the main passage;
opening-closing portions which is disposed in the branch passages respectively and which switches opening-closing states of the branch passages respectively;
a pressure sensor disposed downstream of the air pump in the main passage, wherein the pressure sensor outputs pressure values; and
an abnormality detection portion that switches opening-closing states of the opening-closing portions one by one during the operation of the air pump and that detects abnormalities in components on the basis of an average of the pressure values, wherein the average is calculated based on the output pressure values detected by the pressure sensor within a predetermined period, before and after the switching of each of the opening-closing portions and a difference between the pressure values.

11. The secondary air feeding apparatus according to claim 10, further comprising:
check valves disposed downstream of the opening-closing portions in the branch passages respectively.

12. A secondary air feeding apparatus, comprising:
a secondary air feeding passage that supplies secondary air to a region upstream of a plurality of exhaust gas purification units that are arranged in association with one or more cylinders of a multi-cylinder internal combustion engine;
a main passage forming an upstream portion of the secondary air feeding passage;
a plurality of branch passages forming a downstream portion of the secondary air feeding passage;
an air pump disposed in the main passage;
opening-closing portions which is disposed in the branch passages respectively and which switches opening-closing states of the branch passages respectively by means of an opening signal and a closing signal;
a pressure sensor disposed downstream of the air pump in the main passage; and
an abnormality detection portion that detects, during the operation of the air pump, abnormalities in components of the secondary air feeding apparatus on the basis of an opening pressure value detected by the pressure sensor as a pressure value after the receipt of the opening signal in each of the opening-closing portions and a closing pressure value detected by the pressure sensor as a pressure value after the receipt of the closing signal in each of the opening-closing portions, wherein the opening pressure value and the closing pressure value are averages of pressure values detected by the pressure sensor within a predetermined period.

13. The secondary air feeding apparatus according to claim 12, further comprising:
check valves disposed downstream of the opening-closing portions in the branch passages respectively.

14. The secondary air feeding apparatus according to claim 12, wherein
the abnormality detection portion detects an abnormality in at least one of the opening-closing portions, the air pump, and the secondary air feeding passage.

15. The secondary air feeding apparatus according to claim 14, wherein
if the opening pressure value is smaller than a first threshold, the abnormality detection portion detects that the air pump is abnormal.

16. The secondary air feeding apparatus according to claim 14, wherein
the abnormality detection portion detects an abnormality in each of the opening-closing portions.

17. The secondary air feeding apparatus according to claim 16, wherein
if a difference between the opening pressure value and a partially opening pressure value detected with at least one of the opening-closing portions being closed during the operation of the air pump is equal to or smaller than a predetermined value, the abnormality detection portion detects that the secondary air feeding passage is abnormal.

18. A method of detecting an abnormality in a secondary air feeding apparatus including a secondary air feeding passage that supplies secondary air to a region upstream of an exhaust gas purification unit of an internal combustion engine, an air pump disposed in the secondary air feeding passage, an opening-closing portion which is disposed downstream of the air pump and which switches an opening-closing state of the secondary air feeding passage by means of an opening signal and a closing signal, and a pressure sensor disposed between the air pump and the opening-closing portion, comprising the step of:
detecting, during the operation of the air pump, abnormalities in components of the secondary air feeding apparatus on the basis of an opening pressure value detected by the pressure sensor as a pressure value after the receipt of the opening signal in the opening-closing portion, a closing pressure value detected by the pressure sensor as a pressure value after the receipt of the closing signal in the opening-closing portion, and a difference between the opening pressure value and the closing pressure value, wherein the opening pressure value and the closing pressure value are averages of pressure values detected by the pressure sensor within a predetermined period.

19. The secondary air feeding apparatus according to claim 18, further comprising:

a check valve disposed downstream of the opening-closing portion.

20. A method of detecting an abnormality in a secondary air feeding apparatus including a secondary air feeding passage that supplies secondary air to a region upstream of a plurality of exhaust gas purification units that are arranged in association with one or more cylinders of a multi-cylinder internal combustion engine, a main passage forming an upstream portion of the secondary air feeding passage, a plurality of branch passages forming a downstream portion of the secondary air feeding passage, an air pump disposed in the main passage, opening-closing portion which is disposed in the brunch passages respectively and which switches opening-closing states of the branch passages respectively, and a pressure sensor disposed downstream of the air pump in the main passage, comprising the step of:

detecting, during the operation of the air pump, abnormalities in components of the secondary air feeding apparatus on the basis of an opening pressure value detected by the pressure sensor as a pressure value after the receipt of the opening signal in each of the opening-closing portions and a closing pressure value detected by the pressure sensor as a pressure value after the receipt of the closing signal in each of the opening-closing portions, wherein the opening pressure value and the closing pressure value are averages of pressure values detected by the pressure sensor within a predetermined period.

21. The secondary air feeding apparatus according to claim 20, further comprising:

check valves disposed downstream of the opening-closing portions in the branch passages respectively.

22. The secondary air feeding apparatus according to claim 1, further comprising:

a plurality of malfunction modes, wherein the pressure values specify a certain one of the plurality of malfunction modes.

* * * * *